United States Patent
Fukui et al.

(10) Patent No.: US 12,180,615 B2
(45) Date of Patent: Dec. 31, 2024

(54) METHOD FOR PRODUCING MICRONIZED HYDROPHOBICALLY MODIFIED CELLULOSE FIBER

(71) Applicant: Kao Corporation, Tokyo (JP)

(72) Inventors: Shunsuke Fukui, Tokyo-to (JP); Yutaka Yoshida, Wakayama (JP); Kyohei Yamato, Wakayama (JP); Ryohta Yamamoto, Wakayama (JP)

(73) Assignee: KAO CORPORATION, Tokyo (JP)

( * ) Notice: Subject to any disclaimer, the term of this patent is extended or adjusted under 35 U.S.C. 154(b) by 473 days.

(21) Appl. No.: 16/958,369

(22) PCT Filed: Dec. 21, 2018

(86) PCT No.: PCT/JP2018/047140
§ 371 (c)(1),
(2) Date: Jun. 26, 2020

(87) PCT Pub. No.: WO2019/131472
PCT Pub. Date: Jul. 4, 2019

(65) Prior Publication Data
US 2021/0087713 A1    Mar. 25, 2021

(30) Foreign Application Priority Data
Dec. 27, 2017 (JP) ................... 2017-252461

(51) Int. Cl.
*D01F 2/00* (2006.01)
*C08K 7/02* (2006.01)
*C08L 21/00* (2006.01)
*C08L 87/00* (2006.01)

(52) U.S. Cl.
CPC ............... *D01F 2/00* (2013.01); *C08K 7/02* (2013.01); *C08L 21/00* (2013.01); *C08L 87/00* (2013.01); *D10B 2201/20* (2013.01)

(58) Field of Classification Search
CPC ....... C08K 7/02; C08L 21/00; D10B 2201/20; D01F 2/00–30; D06M 14/04; D06B 11/0003; D06H 7/22–225
USPC ...................................... 428/364
See application file for complete search history.

(56) References Cited

U.S. PATENT DOCUMENTS

| | | |
|---|---|---|
| 2012/0283363 A1 | 11/2012 | Kumamoto et al. |
| 2013/0112193 A1* | 5/2013 | Karppi .......... C08B 15/02 127/37 |
| 2014/0238626 A1 | 8/2014 | Tsuji et al. |
| 2015/0011685 A1 | 1/2015 | Mori et al. |
| 2015/0027648 A1* | 1/2015 | Tsuji ............ D21H 11/18 162/26 |
| 2016/0177512 A1 | 6/2016 | Kawahara et al. |
| 2016/0319467 A1* | 11/2016 | Yamato ............ C08G 81/00 |
| 2016/0340827 A1 | 11/2016 | Yamato et al. |
| 2017/0218567 A1 | 8/2017 | Kajanto et al. |

FOREIGN PATENT DOCUMENTS

| | | |
|---|---|---|
| CN | 104169306 A | 11/2014 |
| CN | 105431587 A | 3/2016 |
| EP | 3 088 422 A1 | 11/2016 |
| JP | 08337996 A * | 12/1996 |
| JP | 2011-140738 A | 7/2011 |
| JP | 2012-81533 A | 4/2012 |
| JP | 2014-34616 A | 2/2014 |
| JP | 2014-125607 A | 7/2014 |
| JP | 2015-7196 A | 1/2015 |
| JP | 5944564 B1 | 7/2016 |
| JP | 2017-7116 A | 1/2017 |
| JP | 2017007116 A * | 1/2017 |
| JP | 2017-133037 A | 8/2017 |
| JP | 2017-527660 A | 9/2017 |
| WO | WO 2013/099770 A1 | 7/2013 |
| WO | WO 2015/098544 A1 | 7/2015 |
| WO | WO 2017/078048 A1 | 5/2017 |

OTHER PUBLICATIONS

Machine Translation of JP 2017007116 A (Year: 2017).*
Abdullah, Rosnah, et al. "Hydrothermal decomposition of various crystalline celluloses as treated by semi-flow hot-compressed water." Journal of Wood Science, vol. 60, No. 4, May 23, 2014, pp. 278-286, https://doi.org/10.1007/s10086-014-1401-7. (Year: 2014).*
Extended European Search Report for European Application No. 18895314.5, dated Sep. 8, 2021.
International Search Report, dated Apr. 2, 2019, for International Application No. PCT/JP2018/047140.
Shimizu et al., "Bulky Quaternary Alkylammonium Counterions Enhance the Nanodispersibility of 2,2,6,6-Tetramethylpiperidine-1-oxyl-Oxidized Cellulose in Diverse Solvents," Biomacromolecules, vol. 15, Apr. 21, 2014, pp. 1904-1909.

(Continued)

*Primary Examiner* — Larissa Rowe Emrich
(74) *Attorney, Agent, or Firm* — Birch, Stewart, Kolasch & Birch, LLP

(57) ABSTRACT

The present invention relates to a method for producing fine hydrophobically modified cellulose fibers wherein anionic group-containing anionically modified cellulose fibers are bound to a modifying group, the method including subjecting hydrophobically modified cellulose fibers having an average fiber length of 1 μm or more and 1,000 μm or less to a finely pulverizing treatment in an organic solvent. The fine hydrophobically modified cellulose fibers obtained by the method for production of the present invention can be suitably used in various resin manufactured articles for daily sundries, household electric appliance parts, wrapping materials for household electric appliance parts, and various industrial applications such as automobile parts.

16 Claims, No Drawings

(56) References Cited

OTHER PUBLICATIONS

Taiwanese Office Action and Search Report for Taiwanese Application No. 107146934, dated Apr. 28, 2023.
Chinese Office Action and Search Report for Chinese Application No. 201880082162.0, dated May 17, 2022.
European Communication pursuant to Article 94(3) EPC for European Application No. 18 895 314.5, dated Sep. 26, 2024.

* cited by examiner

METHOD FOR PRODUCING MICRONIZED HYDROPHOBICALLY MODIFIED CELLULOSE FIBER

FIELD OF THE INVENTION

The present invention relates to a method for producing fine hydrophobically modified cellulose fibers.

BACKGROUND OF THE INVENTION

Conventionally, plastic materials derived from limited resource petroleum have been widely used; however, in the recent years, techniques with less burdens on the environment have been spotlighted. In view of the technical background, materials using cellulose fibers, which are biomass existing in nature in large amounts, among which particularly those using fine cellulose fibers, have been remarked, from the aspect of remarkably improving various mechanical properties.

Usually, since the surface of the fine cellulose fibers is hydrophilic, the fine cellulose fibers undesirably aggregate in a hydrophobic solvent or a hydrophobic resin. For this reason, when the fine cellulose fibers are used in the system as mentioned above, it is necessary to hydrophobically modify the fine cellulose fibers.

Although some methods for hydrophobically modifying fine cellulose fibers have been proposed, most of the methods are methods in which cellulose fibers are once subjected to a dispersion treatment in an aqueous system to finely pulverize, and then subjected to a modification, and the modified cellulose fibers are again subjected to a dispersion treatment in an organic solvent system.

Patent Publication 1 discloses a method for producing a gel-like composition, including dispersing a cellulose having a cellulose I crystal structure in water, and then converting a hydroxyl group of the cellulose into a substituent having a carboxy group; reducing the cellulose with a reducing agent; replacing water, which is a dispersion medium of the cellulose, with an organic solvent; subjecting the above dispersion medium-replaced cellulose to a neutralization reaction with a specified polyether-amine to hydrophobicize; subjecting the hydrophobically treated cellulose to nano-defibrillation to provide a gel-like composition in which the cellulose nanofibers are dispersed in the organic solvent.

In addition, Non-Patent Publication 1 discloses that counterions of bulky quaternary ammonium counterions improve the nano dispersibility of TEMPO-oxidized cellulose in a solvent.

Patent Publication 1: Japanese Patent Gazette No. 5,944,564
Non-Patent Publication 1: M. Shimizu, et al., *Biomacromolecules*, 15 2014

SUMMARY OF THE INVENTION

The present invention relates to the following [1] to [7]:
[1] A method for producing fine hydrophobically modified cellulose fibers wherein anionic group-containing anionically modified cellulose fibers are bound to a modifying group, the method including subjecting hydrophobically modified cellulose fibers having an average fiber length of 1 μm or more and 1,000 μm or less to a finely pulverizing treatment in an organic solvent.
[2] A method for producing a dispersion of fine hydrophobically modified cellulose fibers wherein anionic group-containing anionically modified cellulose fibers are bound to a modifying group, the method including subjecting hydrophobically modified cellulose fibers having an average fiber length of 1 μm or more and 1,000 μm or less to a finely pulverizing treatment in an organic solvent.
[3] Use of hydrophobically modified cellulose fibers wherein anionic group-containing anionically modified cellulose fibers are bound to a modifying group, having an average fiber length of 1 μm or more and 1,000 μm or less, in a method for producing fine hydrophobically modified cellulose fibers.
[4] A method for producing a resin composition including mixing fine hydrophobically modified cellulose fibers produced by a method for production as defined in the above [1], or a dispersion of fine hydrophobically modified cellulose fibers produced by a method for production as defined in the above [2] with a resin.
[5] A method for producing a resin molded article including molding a resin composition produced by a method for producing a resin composition as defined in the above [4].
[6] A resin composition obtained by mixing fine hydrophobically modified cellulose fibers produced by a method for production as defined in the above [1], or a dispersion of fine hydrophobically modified cellulose fibers produced by a method for production as defined in the above [2] with a resin.
[7] A resin molded article containing a resin composition as defined in the above [6] molded therewith.

DETAILED DESCRIPTION OF THE INVENTION

However, in Patent Publication 1 or Non-Patent Publication 1, each is the technique in which a polyether-amine or quaternary ammonium counterions are used as means, so that the modifying group species is limited.

The present invention relates to a method for producing fine hydrophobically modified cellulose fibers having excellent dispersibility, in which low costs and simplifications of the processes are achieved.

According to the method for production of the present invention, the fine hydrophobically modified cellulose fibers having excellent dispersibility can be produced, in which low costs and simplifications of the process are achieved.

The method for production of the present invention includes subjecting hydrophobically modified cellulose fibers having a specified average fiber length to a finely pulverizing treatment in an organic solvent. There are no technical ideas for obtaining an invention having excellent dispersibility in which low costs and simplifications of the processes are achieved according to a production method which remarks on the setting to the range of a specified average fiber length as in the present invention.

The hydrophobically modified cellulose fibers used in the present invention can be produced by introducing the cellulose fibers with an anionic group, introducing the cellulose fibers with a modifying group, and subjecting cellulose fibers to a fiber shortening treatment, irrespective of the orders. The hydrophobically modified cellulose fibers can be produced through any one of the following methods including, for example:
(1) introducing the raw material cellulose fibers with an anionic group to provide anionic group-containing anionically modified cellulose fibers, subjecting the anionic group-containing anionically modified cellulose fibers to a fiber shortening treatment, and subsequently introducing the modified cellulose fibers with a modifying group;

(2) introducing the raw material cellulose fibers with an anionic group to provide anionic group-containing anionically modified cellulose fibers, introducing the anionic group-containing anionically modified cellulose fibers with a modifying group, and subsequently subjecting the anionically modified cellulose fibers to a fiber shortening treatment; and (3) subjecting the raw material cellulose fibers to a fiber shortening treatment, introducing the shortened cellulose fibers with an anionic group to provide anionic group-containing anionically modified cellulose fibers, and subsequently introducing the above cellulose fibers with a modifying group.

Further, when a modifying group is introduced at a hydroxyl group, in addition to the above methods for production (1) to (3), the hydrophobically modified cellulose fibers can also be produced through any one of the following methods including:

(4) introducing the raw material cellulose fibers with a modifying group at a hydroxyl group, introducing the modified cellulose fibers with an anionic group, and subsequently subjecting the modified cellulose fibers to a fiber shortening treatment;

(5) introducing the raw material cellulose fibers with a modifying group at a hydroxyl group, subjecting the modified cellulose fibers to a fiber shortening treatment, and subsequently introducing the fiber-shortened cellulose fibers with an anionic group; and (6) subjecting the raw material cellulose fibers to a fiber shortening treatment, introducing the shortened cellulose fibers with a modifying group at a hydroxyl group, and subsequently introducing the cellulose fibers with an anionic group.

It is more preferable to adopt the process of (1), from the viewpoint of exhibiting the effects of the present invention. Here, when the fiber length of the raw material cellulose fibers is 1,000 μm or less, the step of the above fiber shortening treatment can be omitted.

[Cellulose Fibers]

As the raw material cellulose fibers, it is preferable to use natural cellulose fibers, from the viewpoint of environmental burden. The natural cellulose fibers include, for example, those from wooden pulp such as pulp from needle-leaf trees and pulp from broad-leaf trees; cotton pulp such as cotton linter and cotton lint; non-wooden pulp such as maize straw pulp and bagasse pulp; bacteria cellulose; and the like. These natural cellulose fibers can be used alone or in a combination of two or more kinds.

The average fiber diameter of the raw material cellulose fibers is, but not particularly limited to, preferably 1 μm or more, more preferably 5 μm or more, and even more preferably 15 μm or more, from the viewpoint of handling property and costs, and on the other hand, the average fiber diameter is preferably 300 μm or less, more preferably 100 μm or less, and even more preferably 60 μm or less.

In addition, the average fiber length of the raw material cellulose fibers is, but not particularly limited to, preferably exceeding 1,000 μm, more preferably 1,200 μm or more, and even more preferably 1,500 μm or more, and preferably 10,000 μm or less, more preferably 5,000 μm or less, and even more preferably 3,000 μm or less, from the viewpoint of availability and costs. The average fiber diameter and the average fiber length of the raw material cellulose fibers can be measured in accordance with the methods described in Examples set forth below.

[Anionic Group-Containing Anionically Modified Cellulose Fibers]

The anionic group-containing anionically modified cellulose fibers (also simply referred to as "anionically modified cellulose fibers") usable in the present invention are cellulose fibers that are anionically modified so that the cellulose fibers contain an anionic group.

The preferred ranges of the average fiber diameter and the average fiber length of the anionically modified cellulose fibers depend upon the orders of the production steps. For example, when the anionically modified cellulose fibers are not subjected to a fiber shortening treatment, the preferred ranges of the average fiber diameter and the average fiber length of the anionically modified cellulose fibers are of the same levels as those of the raw material cellulose fibers. When the anionically modified cellulose fibers are subjected to a fiber shortening treatment, the preferred ranges of the average fiber diameter and the average fiber length of the anionically modified cellulose fibers are of the same levels as those of the fiber-shortened cellulose fibers described later.

The anionically modified cellulose fibers have a content of an anionic group of preferably 0.1 mmol/g or more, more preferably 0.5 mmol/g or more, and even more preferably 0.8 mmol/g or more, from the viewpoint of stable fine pulverization and introduction of modifying group. The upper limit of the content of an anionic group is preferably 3 mmol/g or less, more preferably 2 mmol/g or less, and even more preferably 1.8 mmol/g or less. In order to have the content of an anionic group within the range as mentioned above, the content of an anionic group can be controlled by, for example, adjusting the treatment conditions of oxidization treatment or the like, or carrying out a reducing treatment. The content of an anionic group means a total amount of anionic groups in the cellulose fibers constituting the anionic group-containing cellulose fibers, which is measured in accordance with a method described in Examples set forth below.

In addition, the content of a hydroxyl group in the anionically modified cellulose fibers is preferably 0.5 mmol/g or more, more preferably 1.0 mmol/g or more, and even more preferably 2.0 mmol/g or more, from the same viewpoint. The upper limit of the content of a hydroxyl group is preferably 20 mmol/g or less, more preferably 19 mmol/g or less, and even more preferably 18 mmol/g or less. The content of a hydroxyl group of the anionically modified cellulose fibers is measured in accordance with a method described in Examples set forth below.

The anionic group contained in the anionically modified cellulose fibers includes, for example, a carboxy group, a sulfonate group, a phosphate group, and the like, and the carboxy group is preferred, from the viewpoint of the introduction efficiency to the cellulose fibers.

The ions pairing with the anionic group (counterions) in the anionically modified cellulose fibers include metal ions which are generated in the presence of an alkali during the production, such as sodium ions, potassium ions, calcium ions, and aluminum ions, and protons generated by replacing these metal ions with an acid.

(Step of Introducing with Anionic Group)

The Anionically Modified Cellulose Fibers Usable in the Present invention can be obtained by subjecting the cellulose fibers to be treated to an oxidation treatment or an addition treatment of an anionic group and introducing the cellulose fibers with at least one or more anionic groups, to anionically modify.

The cellulose fibers to be treated for anionic modification include
(1) the raw material cellulose fibers, and
(2) fiber-shortened cellulose fibers obtained by subjecting the raw material cellulose fibers to a fiber shortening treatment.

It is preferable that the cellulose fibers to be treated for anionic modification are the raw material cellulose fibers of (1), from the viewpoint of exhibiting the effects of the present invention.

(i) A Case of Introducing Cellulose Fibers with a Carboxy Group as an Anionic Group The method of introducing the cellulose fibers with a carboxy group as an anionic group includes, for example, a method of oxidizing the cellulose at a hydroxyl group to convert the hydroxyl group to a carboxy group, and a method of treating the cellulose at a hydroxyl group with at least one member selected from the group consisting of compounds having a carboxy group, acid anhydrides of the compounds having a carboxy group, and derivatives thereof.

The method of subjecting the above cellulose to an oxidization treatment at a hydroxyl group is not particularly limited. For example, a method of subjecting to an oxidization treatment including treating the cellulose with an oxidizing agent such as sodium hypochlorite and a bromide such as sodium bromide using 2,2,6,6-tetramethyl-1-piperidine-N-oxyl (TEMPO) as a catalyst can be applied. More specifically, a reference can be made to a method described in Japanese Patent Laid-Open No. 2011-140632.

By subjecting the cellulose fibers to an oxidization treatment using TEMPO as a catalyst, a hydroxymethyl group ($-CH_2OH$) at C6 position of the cellulose constituting unit is selectively converted to a carboxy group. In particular, this method is advantageous in the aspects that the selectivity of a hydroxyl group at C6 position to be oxidized on the surface of the raw material cellulose fibers is excellent, and reaction conditions are mild. Therefore, a preferred embodiment of the anionically modified cellulose fibers in the present invention includes cellulose fibers in which C6 position of the cellulose constituting unit is a carboxy group. The cellulose fibers as used herein may be referred to as "oxidized cellulose fibers."

The compound having a carboxy group for use in the introduction of the cellulose fibers with a carboxy group is not particularly limited, and specific examples include halogenated acetic acids, and the halogenated acetic acid includes chloroacetic acid and the like.

The acid anhydrides of a compound having a carboxy group and derivatives thereof, for use in the introduction of the cellulose fibers with a carboxy group are not particularly limited, which include acid anhydrides of dicarboxylic acid compounds such as maleic anhydride, succinic anhydride, phthalic anhydride, and adipic anhydride; imidation products of the acid anhydrides of a compound having a carboxy group; and derivatives of the acid anhydrides of a compound having a carboxy group. These compounds may be substituted with a hydrophobic group.

(ii) A Case of Introducing Cellulose Fibers with a Sulfonate Group or a Phosphate Group as an Anionic Group The method of introducing cellulose fibers with a sulfonate group as an anionic group includes a method of adding sulfuric acid to the cellulose fibers and heating, and the like.

The method of introducing cellulose fibers with a phosphate group as an anionic group includes a method of mixing cellulose fibers which are in a dry state or a wet state with a powder or an aqueous solution of phosphoric acid or a phosphoric acid derivative; a method of adding an aqueous solution of phosphoric acid or a phosphoric acid derivative to a dispersion of cellulose fibers; and the like. When these methods are employed, a dehydration treatment, a heating treatment and the like are generally carried out after mixing or adding a powder or an aqueous solution of phosphoric acid or a phosphoric acid derivative.

[Cellulose Fibers Subjected to Fiber Shortening Treatment]

The cellulose fibers subjected to a fiber shortening treatment (hereinafter also referred to as fiber-shortened cellulose fibers) refer to cellulose fibers having an average fiber length of 1 μm or more and 1,000 μm or less.

The average fiber length of the fiber-shortened cellulose fibers is preferably 5 μm or more, more preferably 10 μm or more, and even more preferably 25 μm or more, from the viewpoint of dispersibility, and on the other hand, the average fiber length is preferably 800 μm or less, more preferably 500 μm or less, and even more preferably 400 μm or less, from the same viewpoint. The average fiber diameter of the fiber-shortened cellulose fibers is not particularly limited, and the preferred ranges are of the same level as those of the raw material cellulose fibers, and the average fiber diameter is specifically preferably 1 μm or more, more preferably 5 μm or more, and even more preferably 15 μm or more, and on the other hand, the average fiber diameter is preferably 300 μm or less, more preferably 100 μm or less, and even more preferably 60 μm or less. The average fiber diameter and the average fiber length of the fiber-shortened cellulose fibers can be measured in accordance with the methods described in Examples set forth below.

(Step of Subjecting Cellulose Fibers to Fiber Shortening Treatment)

The fiber-shortened cellulose fibers usable in the present invention can be obtained by subjecting cellulose fibers to be treated to a fiber shortening treatment. The cellulose fibers to be treated to a fiber shortening treatment include
(1) anionically modified cellulose fibers obtained through the step of introducing the raw material cellulose fibers with an anionic group;
(2) anionically modified cellulose fibers obtained through the steps of introducing the raw material cellulose fibers with an anionic group, and subsequently introducing the cellulose fibers with a modifying group into; and
(3) the raw material cellulose fibers.

It is preferable that the cellulose fibers to be treated to a fiber shortening treatment are the anionically modified cellulose fibers of (1), from the viewpoint of exhibiting the effects of the present invention.

The fiber shortening treatment can be accomplished by subjecting cellulose fibers to be treated to one or more treatment methods selected from the group consisting of alkali hydrolysis treatment, acid hydrolysis treatment, ultraviolet treatment, electronic beam treatment, hydrothermal decomposition treatment, mechanical treatment, and enzyme treatment. By subjecting to a fiber shortening treatment, it is assumed that the tangling of the cellulose fibers themselves is reduced, thereby improving the dispersibility when fine hydrophobically modified cellulose fibers are obtained.

The conditions for the alkali hydrolysis treatment include conditions, for example, such that a solution or dispersion having a solid ingredient content of the cellulose fibers to be treated of preferably 0.1% by mass or more, and preferably 10.0% by mass or less, and having a pH of preferably 8.0 or more, and preferably 15.0 or less, is furnished, and that this solution or dispersion is heated at preferably 60° C. or higher, and preferably 110° C. or lower, for preferably 30 minutes or more, and preferably 240 minutes or less. The medium for the solution or dispersion is preferably water or ethanol. The alkali which can be used in the adjustment of a pH is preferably sodium hydroxide, lithium hydroxide, or potassium hydroxide. The solution or dispersion may contain hydrogen peroxide in an amount of preferably 0.5 parts by mass or more, and preferably 2.5 parts by mass or less, based on 100 parts by mass of the anionic group-containing cellulose fibers.

The conditions for the acid hydrolysis treatment include conditions, for example, such that a solution or dispersion having a solid ingredient content of the cellulose fibers to be treated of preferably 0.1% by mass or more, and preferably 10.0% by mass or less, and having a pH of preferably 0.1 or more, and preferably 4.0 or less, is furnished, and that this solution or dispersion is heated at preferably 80° C. or higher, and preferably 120° C. or lower, for preferably 5 minutes or more, and preferably 240 minutes or less. The medium for the solution or dispersion is preferably water or ethanol. The acid which can be used in the adjustment of a pH is preferably an inorganic acid such as hydrochloric acid, sulfuric acid, nitric acid, or phosphoric acid, and an organic acid such as acetic acid, citric acid, or malic acid, more preferably hydrochloric acid, sulfuric acid, nitric acid, phosphoric acid, acetic acid, or citric acid, and even more preferably hydrochloric acid, from the viewpoint of availability and costs.

[Hydrophobically Modified Cellulose Fibers]

The hydrophobically modified cellulose fibers in the present invention are cellulose fibers in which anionic group-containing anionically modified cellulose fibers are bound to a modifying group. Specific binding forms of the modifying group and the anionic group include preferably an ionic bonding with an amine salt or the like, and/or a covalent bonding such as an amide bonding, and an ester bonding and an urethane bonding, from the viewpoint of dispersibility.

The average fiber length of the hydrophobically modified cellulose fibers is 1 μm or more, preferably 5 μm or more, more preferably 10 μm or more, and even more preferably 25 μm or more, from the viewpoint of dispersibility, and on the other hand, the average fiber length is 1,000 μm or less, preferably 800 μm or less, more preferably 500 μm or less, and even more preferably 400 μm or less, from the same viewpoint. The average fiber diameter of the hydrophobically modified cellulose fibers is not particularly limited, and the average fiber diameter in the preferred ranges is similar to those of the raw material cellulose fibers, i.e., preferably 1 μm or more, more preferably 5 μm or more, and even more preferably 15 μm or more, and on the other hand, the average fiber diameter is preferably 300 μm or less, more preferably 100 μm or less, and even more preferably 60 μm or less. The average fiber diameter and the average fiber length of the hydrophobically modified cellulose fibers can be measured in accordance with the methods described in Examples set forth below.

A total mass of the modifying group in the hydrophobically modified cellulose fibers, based on 100 parts by mass of the amount of the cellulose fibers, is preferably 1 part by mass or more, more preferably 10 parts by mass or more, and even more preferably 15 parts by mass or more, from the viewpoint of dispersibility. On the other hand, a total mass, based on 100 parts by mass of the amount of cellulose fibers, is preferably 200 parts by mass or less, more preferably 150 parts by mass or less, and even more preferably 100 parts by mass or less, from the viewpoint of exhibiting reinforcing properties for strength or the like when the fibers are applied to a resin or the like. A total mass of the modifying group in the hydrophobically modified cellulose fibers as used herein can be obtained in accordance with a method described in Examples set forth below.

The average binding amount of the modifying group in the hydrophobically modified cellulose fibers is preferably 0.01 mmol/g or more, more preferably 0.05 mmol/g or more, even more preferably 0.1 mmol/g or more, even more preferably 0.3 mmol/g or more, and even more preferably 0.5 mmol/g or more, from the viewpoint of improving the dispersibility. In addition, the average binding amount is preferably 3 mmol/g or less, more preferably 2.5 mmol/g or less, even more preferably 2 mmol/g or less, even more preferably 1.8 mmol/g or less, and even more preferably 1.5 mmol/g or less, from the viewpoint of the reactivities. Here, in a case where the cellulose fibers are simultaneously introduced with two or more optional modifying groups as modifying groups, it is preferable that the average binding amount of the modifying groups is within the range defined above for the total amount of the modifying groups to be introduced.

The introduction ratio of the modifying group in the hydrophobically modified cellulose fibers, for any one of the modifying groups, is preferably 5% or more, more preferably 10% or more, and even more preferably 15% or more, from the viewpoint of dispersibility, and the introduction ratio is preferably 100% or less, more preferably 60% or less, and even more preferably 50% or less, from the viewpoint of the reactivities.

The average binding amount and the introduction ratio of the modifying group as used herein can be adjusted by an amount of the modifying group species, the kinds of the modifying group species, a reaction temperature, a reaction time, a solvent, or the like. The average binding amount, mmol/g, and the introduction ratio, %, of the modifying group refer to an amount and a proportion of the modifying group introduced to the surface of the hydrophobically modified cellulose fibers at an anionic group or a hydroxyl group. The content of the anionic group and the content of the hydroxyl group of the hydrophobically modified cellulose fibers can be calculated by the measurements in accordance with a known method (for example, titration, IR determination, or the like). The average binding amount and the introduction ratio of the modifying group can be calculated in accordance with, for example, methods described in Examples.

The hydrophobically modified cellulose fibers wherein the anionic group-containing anionically modified cellulose fibers are bound to a modifying group, having an average fiber length of 1 μm or more and 1,000 μm or less can be suitably used in a method for producing fine hydrophobically modified cellulose fibers. Therefore, one of the preferred embodiments of the present invention is use of a hydrophobically modified cellulose fibers wherein the anionic group-containing anionically modified cellulose fibers are bound to a modifying group, having an average fiber length of 1 μm or more and 1,000 μm or less, in a method for producing fine hydrophobically modified cellulose fibers.

(Step of Introducing Cellulose Fibers with Modifying Group)

The hydrophobically modified cellulose fibers usable in the present invention can be obtained by introducing cellulose fibers to be treated with a given modifying group (also referred to as "modifying or modification"). The cellulose fibers to be introduced with a modifying group include (1) anionically modified cellulose fibers obtained through the steps of introducing the raw material cellulose fibers with an anionic group, and subsequently subjecting the cellulose fibers to a fiber shortening treatment;
(2) anionically modified cellulose fibers obtained through the steps of introducing the raw material cellulose fibers with an anionic group; and
(3) anionically modified cellulose fibers obtained through the steps of subjecting the raw material cellulose fibers to a fiber shortening treatment, and subsequently introducing the raw material cellulose fibers with an anionic group.

It is preferable that the cellulose fibers to be introduced with a modifying group are the anionically modified cellulose fibers of (1), from the viewpoint of exhibiting the effects of the present invention.

The cellulose fibers to be introduced with a modifying group, from the viewpoint of improving dispersibility in a hydrophobic solvent or a hydrophobic resin. It is preferable that the modifying group is bound to one or more groups selected from anionic groups and a hydroxyl group contained in the cellulose fibers to be treated, and it is more preferable that a compound having a modifying group is bound to an anionic group via an ionic bonding and/or a covalent bonding.

In order to bind a modifying group to an anionic group and/or a hydroxyl group, it is preferable to use, for example, a compound having a modifying group (also referred to as "modifying group species"). As the modifying group species, an appropriate one may be selected in accordance with the binding form with an anionic group or a hydroxyl group.

When the binding form is an ionic bonding, the cellulose fibers can be introduced with a modifying group referring to Japanese Patent Laid-Open No. 2015-143336. Here, the modifying group species includes one or more amines selected from the group consisting of the amines represented by the following general formulas (1) to (3):

$$NH_2\text{---}R^1 \qquad (1)$$

$$NH\text{---}R^2R^{2'} \qquad (2)$$

$$N\text{---}R^3R^{3'}R^{3''} \qquad (3)$$

wherein $R^1$ in the general formula (1) is a linear or branched, saturated or unsaturated hydrocarbon group having 6 or more carbon atoms and 30 or less carbon atoms; each of $R^2$ and $R^{2'}$ in the general formula (2), which may be identical or different, is a linear or branched, saturated or unsaturated hydrocarbon group in which a total number of carbon atoms of $R^2$ and $R^{2'}$ is 8 or more and 40 or less; and each of $R^3$, and in the general formula (3), which may be identical or different, is a linear or branched, saturated or unsaturated hydrocarbon group in which a total number of carbon atoms of $R^3$, and is 9 or more and 50 or less, primary amines, secondary amines, tertiary amines, phosphonium compounds, and the like.

The number of carbon atoms in R' is preferably 8 or more, more preferably 10 or more, and even more preferably 12 or more, from the viewpoint of dispersibility. On the other hand, the number of carbon atoms is preferably 24 or less, more preferably 20 or less, and even more preferably 18 or less, from the same viewpoint.

A total number of carbon atoms of $R^2$ and $R^{2'}$ is preferably 8 or more, more preferably 10 or more, and even more preferably 12 or more, from the viewpoint of dispersibility. On the other hand, a total number of carbon atoms is preferably 36 or less, more preferably 30 or less, and even more preferably 24 or less, from the same viewpoint.

A total number of carbon atoms of $R^3$, and is preferably 9 or more, more preferably 10 or more, and even more preferably 12 or more, from the viewpoint of dispersibility. On the other hand, a total number of carbon atoms is preferably 42 or less, more preferably 36 or less, and even more preferably 24 or less, from the same viewpoint.

These compounds can be introduced with various hydrocarbon groups as a modifying group, including, for example, acyclic saturated hydrocarbon groups, acyclic unsaturated hydrocarbon groups, cyclic saturated hydrocarbon groups, and aromatic hydrocarbon groups, or a copolymer moiety or the like. Introduction of these groups or moieties may be carried out alone or in a combination of two or more kinds. The number of carbon atoms of these various hydrocarbon groups is preferably 6 or more, from the viewpoint of dispersibility, and the number of carbon atoms is preferably 30 or less, more preferably 24 or less, and preferably 18 or less, from the same viewpoint.

The primary to tertiary amines preferably have the number of carbon atoms of preferably 2 or more, and more preferably 6 or more, from the viewpoint of dispersibility, and the amines have the number of carbon atoms of preferably 30 or less, more preferably 24 or less, and even more preferably 18 or less, from the same viewpoint. Specific examples of the primary amines to the tertiary amines include, for example, propylamine, dipropylamine, butylamine, dibutylamine, hexylamine, 2-ethylhexylamine, dihexylamine, trihexylamine, octylamine, dioctylamine, trioctylamine, dodecylamine, didodecylamine, stearylamine, distearylamine, oleylamine, aniline, octadecylamine, and dimethylbehenylamine. Among them, hexylamine, 2-ethylhexylamine, dihexylamine, trihexylamine, dodecylamine, oleylamine, stearylamine, dihexylamine, and trihexylamine are preferred, from the viewpoint of dispersibility.

When a phosphonium compound is used as a modifying group species, the anionic component thereof includes preferably halide ions such as chloride ions and bromide ions, hydrogensulfate ions, perchlorate ions, tetrafluoroborate ions, hexafluorophosphate ions, trifluoromethanesulfonate ions, and hydroxy ions, and more preferably includes hydroxy ions, from the viewpoint of the reactivities.

When the binding form is covalent binding, an appropriate modifying group species is used in accordance with the matter that an anionic group is modified, or a hydroxyl group is modified. When the anionic group is modified, for example, when the anionic group is modified via an amide bonding, a modifying group can be introduced by referring to Japanese Patent Laid-Open No. 2015-143337. Here, as the modifying group species, it is preferable to use, for example, one or more members selected from the group consisting of the amine represented by the general formula (1), the amine represented by the general formula (2), the primary amines, and the secondary amines. When the anionic group is modified via an ester bonding, it is preferable to use, for example, an alcohol such as butanol, octanol, and dodecanol as a modifying group species. When the anionic group is modified via a urethane bonding, it is preferable to use, for example, an isocyanate compound as a modifying group species. These compounds can be introduced with various hydrocarbon groups as a modifying group, including, for example, acyclic saturated hydrocarbon groups, acyclic unsaturated hydrocarbon groups, cyclic saturated hydrocarbon groups, and aromatic hydrocarbon groups, or a copolymer moiety or the like. Introduction of these groups or moieties may be carried out alone or in a combination of two or more kinds.

When a hydroxyl group is modified, for example, when a hydroxyl group is modified via an ester bonding, as a modifying group species, it is preferable to use, for example, an acid anhydride (e.g., acetic anhydride, propionic anhydride), or an acid halide (e.g., caprylic acid chloride, lauric acid chloride, and stearic acid chloride). When a hydroxyl group is modified via an ether bonding, as a modifying group species, preferred are, for example, epoxy compounds (e.g., alkylene oxides and alkyl glycidyl ethers), alkyl halides and derivatives thereof (e.g., methyl chloride, ethyl chloride, and octadecyl chloride). When a hydroxyl group is modified via a urethane bonding, it is preferable to use, for example, an isocyanate compound as a modifying group species. These compounds can be introduced with various hydrocarbon groups as a modifying group, including, for example, acyclic saturated hydrocarbon groups, acyclic unsaturated hydrocarbon groups, cyclic saturated hydrocarbon groups, and aromatic hydrocarbon groups, or a copolymer moiety or the like. Introduction of these groups or moieties may be carried out alone or in a combination of two or more kinds.

When the modifying group species has an acyclic saturated hydrocarbon group mentioned above as a modifying group, the acyclic saturated hydrocarbon group may be linear or branched. The number of carbon atoms of the acyclic saturated hydrocarbon group is such that the number of carbon atoms of one modifying group is preferably 3 or more, more preferably 4 or more, and even more preferably 6 or more, from the viewpoint of improving dispersibility, and the number of carbon atoms is preferably 30 or less, more preferably 24 or less, and even more preferably 18 or less, from the same viewpoint. Specific examples include a hexyl group, a 2-ethylhexyl group, a dodecyl group, a dihexyl group, a trihexyl group, and the like.

When the modifying group species has an acyclic unsaturated hydrocarbon group mentioned above as a modifying group, the acyclic unsaturated hydrocarbon group may be linear or branched. The number of carbon atoms of the acyclic unsaturated hydrocarbon group is such that the number of carbon atoms of one modifying group is preferably 3 or more, more preferably 4 or more, and even more preferably 6 or more, from the viewpoint of improving dispersibility, and the number of carbon atoms is preferably 30 or less, more preferably 24 or less, and even more preferably 18 or less, from the same viewpoint. Specific examples include an oleyl group, and the like.

When the modifying group species has a cyclic saturated hydrocarbon group mentioned above as a modifying group, the number of carbon atoms of the cyclic saturated hydrocarbon group is such that the number of carbon atoms of one modifying group is preferably 3 or more, more preferably 4 or more, and even more preferably 6 or more, from the viewpoint of improving dispersibility, and the number of carbon atoms is preferably 30 or less, more preferably 24 or less, and even more preferably 18 or less, from the same viewpoint.

When the modifying group species has an aromatic hydrocarbon group mentioned above as a modifying group, the number of carbon atoms of the aromatic hydrocarbon group is such that the number of carbon atoms in one modifying group is 6 or more, from the viewpoint of improving dispersibility, and the number of carbon atoms is preferably 30 or less, more preferably 24 or less, even more preferably 18 or less, even more preferably 14 or less, and even more preferably 10 or less, from the same viewpoint.

When the modifying group is a hydrocarbon group, and the hydrocarbon group has a substituent, as the conditions that the number of carbon atoms in the modifying group satisfies the range defined above, as the substituent, for example, a linear or branched alkoxy group having from 1 to 6 carbon atoms; a linear or branched alkoxycarbonyl group of which alkoxy group has from 1 to 6 carbon atoms; a halogen atom such as a bromine atom or an iodine atom; an acyl group having from 1 to 6 carbon atoms; an aralkyl group; an aralkyloxy group; an alkylamino group having from 1 to 6 carbon atoms; a dialkylamino group of which alkyl group has 1 to 6 carbon atoms, a hydroxyl group, an ether, an amide, or the like may be used. Here, various hydrocarbon groups mentioned above themselves may be bound to a different hydrocarbon group as a substituent.

As the primary amines, the secondary amines, the tertiary amines, the phosphonium compounds, the acid anhydrides, and the isocyanate compounds which can provide various modifying groups mentioned above, a commercially available product can be used, or the compounds can be prepared in accordance with known methods.

In the fine hydrophobically modified cellulose fibers in the present invention, the modifying group thereof can contain a copolymer moiety. As the copolymer moiety, for example, an ethylene oxide/propylene oxide (EO/PO) copolymer moiety or the like can be used. The EO/PO copolymer moiety means a structure in which ethylene oxides (EO) and propylene oxides (PO) are polymerized in a random or block form.

The PO content ratio, % by mol, in the EO/PO copolymer moiety is preferably 1% by mol or more, more preferably 5% by mol or more, even more preferably 7% by mol or more, and even more preferably 10% by mol or more, from the viewpoint of improving dispersibility. The content ratio is preferably 100% by mol or less, more preferably 90% by mol or less, even more preferably 85% by mol or less, even more preferably 75% by mol or less, even more preferably 60% by mol or less, even more preferably 50% by mol or less, even more preferably 40% by mol or less, and even more preferably 30% by mol or less, from the same viewpoint.

The molecular weight of the EO/PO copolymer moiety is preferably 500 or more, more preferably 1,000 or more, and even more preferably 1,500 or more, from the viewpoint of improving dispersibility. The molecular weight is preferably 10,000 or less, more preferably 7,000 or less, even more preferably 5,000 or less, even more preferably 4,000 or less, even more preferably 3,500 or less, and even more preferably 2,500 or less, from the same viewpoint.

When the modifying group species is an amine having an EO/PO copolymer moiety and an amino group, the EO/PO copolymer moiety and the amino group may be bound directly or via a linking group. The linking group is preferably, for example, a hydrocarbon group, and particularly, an alkylene group having the number of carbon atoms of preferably 1 or more and 6 or less, and more preferably 1 or more and 3 or less is used. As the alkylene group, for example, an ethylene group and a propylene group are preferred.

The amine having an EO/PO copolymer moiety (also referred to as "EOPO amine") includes, for example, a compound represented by the following formula (i):

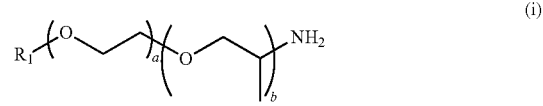

(i)

wherein $R_1$ is a hydrogen atom, a linear or branched alkyl group having from 1 to 6 carbon atoms, in which EO and PO are present in a random or block form; a is a positive number showing an average number of moles of EO added; and b is a positive number showing an average number of moles of PO added.

a in the formula (i) shows an average number of moles of EO added, and it is preferably 11 or more, more preferably 15 or more, even more preferably 20 or more, even more preferably 25 or more, and even more preferably 30 or more, from the viewpoint of even more improving the dispersibility, and it is preferably 100 or less, more preferably 70 or less, even more preferably 60 or less, and even more preferably 50 or less, from the same viewpoint.

b in the formula (i) shows an average number of moles of PO added, and it is preferably 1 or more, more preferably 3 or more, and even more preferably 5 or more, from the viewpoint of even more improving the dispersibility, and it is preferably 50 or less, more preferably 40 or less, even more preferably 30 or less, even more preferably 25 or less, even more preferably 20 or less, even more preferably 15 or less, and even more preferably 10 or less, from the same viewpoint.

In addition, as to the PO content ratio, % by mol, in the EO/PO copolymer moiety, when an amine is represented by the formula (i) defined above, the PO content ratio in the copolymer moiety can be calculated from a and b mentioned above, which can be obtained by the formula: $b \times 100/(a+b)$. The preferred range of the PO content ratio is as mentioned above.

It is preferable that $R_1$ in the formula (i) is a hydrogen atom, from the viewpoint of improving dispersibility. When $R_1$ is a linear or branched alkyl group having from 1 to 6 carbon atoms, the alkyl group is preferably a methyl group, an ethyl group, an n-propyl group and a sec-propyl group.

The details for the EOPO amine represented by the formula (i) are described in Japanese Patent Gazette No. 6,105,139.

[Fine Hydrophobically Modified Cellulose Fibers]

The fine hydrophobically modified cellulose fibers refer to hydrophobically modified cellulose fibers having an average fiber diameter and an average fiber length within the ranges defined as follows.

The average fiber diameter of the fine hydrophobically modified cellulose fibers is preferably 0.1 nm or more, more preferably 0.5 nm or more, even more preferably 1 nm or more, and even more preferably 2 nm or more, from the viewpoint of the dispersibility. In addition, the average fiber diameter is preferably 200 nm or less, more preferably 100 nm or less, even more preferably 50 nm or less, and even more preferably 20 nm or less, from the same viewpoint.

The average fiber length of the fine hydrophobically modified cellulose fibers is preferably 50 nm or more, more preferably 80 nm or more, and even more preferably 100 nm or more, from the viewpoint of the dispersibility. In addition, the average fiber length is preferably 1,000 nm or less, more preferably 500 nm or less, and even more preferably 300 nm or less, from the same viewpoint. The average fiber diameter and the average fiber length of the fine hydrophobically modified cellulose fibers are measured in accordance with the methods described in Examples set forth below.

The preferred range of the average binding amount of the modifying group and the preferred range of the introduction ratio of the modifying group in the fine hydrophobically modified cellulose fibers are of the same levels as those of the fiber-shortened cellulose fibers mentioned above.

(Step of Preparing Fine Hydrophobically Modified Cellulose Fibers)

This step is a step of subjecting hydrophobically modified cellulose fibers having a given average fiber length to a finely pulverizing treatment in an organic solvent, so that fine hydrophobically modified cellulose fibers are obtained by the finely pulverizing treatment. In the step of a finely pulverizing treatment, it is preferable that the hydrophobically modified cellulose fibers obtained as mentioned above in the state of dispersion in an organic solvent or those newly dispersed in a solvent after the removal of an organic solvent are subjected to a finely pulverizing treatment. For example, the step can be carried out in reference to the explanation of the finely pulverizing step of Japanese Patent Laid-Open No. 2013-151661.

(Dispersing Machine)

An apparatus which can be used in the finely pulverizing treatment includes preferably a known dispersing machine. For example, an agitator equipped with agitating blades, a disintegrator, a beating machine, a low-pressure homogenizer, a high-pressure homogenizer, a grinder, a cutter mill, a ball-mill, a jet mill, a roll-mill, a short shaft kneader, a twin-screw kneader, a short shaft extruder, a twin-screw extruder, an ultrasonic agitator, a juice mixer for households, or the like can be used. The operating conditions of the apparatus may be appropriately set while referring to the attached handling manuals.

(Organic Solvent)

The organic solvent which can be used during the finely pulverizing treatment preferably contains one or more organic solvents selected from the group consisting of N,N-dimethylformamide, dimethyl sulfoxide, N,N-dimethylacetamide, N-methylpyrrolidone, tetrahydrofuran (THF), a diester obtained from succinic acid and triethylene glycol monomethyl ether, dichloromethane, chloroform, toluene, acetic acid, methanol, ethanol, benzyl alcohol, n-propanol, 2-propanol, ethylene glycol, propylene glycol, t-butyl alcohol, cyclohexanone, acetonitrile, silicone oil, 1,3-dioxolane, methyl acetate, ethyl acetate, butyl acetate, acetone, and methyl ethyl ketone, from the viewpoint of the dispersibility, more preferably containing one or more organic solvents selected from the group consisting of N,N-dimethylformamide, dimethyl sulfoxide, N,N-dimethylacetamide, N-methylpyrrolidone, methanol, ethanol, benzyl alcohol, n-propanol, ethyl acetate, and ethylene glycol, and even more preferably containing one or more organic solvents selected from the group consisting of N,N-dimethylformamide, dimethyl sulfoxide, N,N-dimethylacetamide, and N-methylpyrrolidone.

In addition, as organic solvents other than those mentioned above, an organic solvent having a reactive functional group can be used. The organic solvent having a reactive functional group includes, for example, acrylates such as methyl acrylate, methyl methacrylate, ethyl acrylate, ethyl methacrylate, butyl acrylate, butyl methacrylate, n-hexyl acrylate, n-hexyl methacrylate, 2-ethylhexyl acrylate, 2-ethylhexyl methacrylate, and phenyl glycidyl ether acrylate; urethane prepolymers such as hexamethylene diisocyanate urethane prepolymers and phenyl glycidyl ether acrylate toluene diisocyanate urethane prepolymers; glycidyl ethers such as n-butyl glycidyl ether, 2-ethylhexyl glycidyl ether, stearyl glycidyl ether, styrene oxide, phenyl glycidyl ether, nonylphenyl glycidyl ether, butylphenyl glycidyl ether, 1,6-hexanediol diglycidyl ether, ethylene glycol diglycidyl ether, and diethylene glycol diglycidyl ether; chlorostyrene, methoxystyrene, butoxystyrene, vinylbenzoic acid, and the like.

Since it is assumed that the organic solvent as mentioned above has a high affinity with the hydrophobically modified cellulose fibers, it is assumed that the dispersibility of the cellulose fiber is even more enhanced by the use of the organic solvent during the preparation or the finely pulverizing treatment of the hydrophobically modified cellulose fibers, whereby consequently the fine hydrophobically modified cellulose fibers also exhibit high dispersibility.

In the organic solvent usable in the present invention, the dielectric constant at 25° C. is preferably 75 or less, more preferably 55 or less, and even more preferably 45 or less, from the viewpoint of even more fully exhibiting the effects of the present invention, and on the other hand, the dielectric constant is preferably 1 or more, more preferably 2 or more, and even more preferably 3 or more. Here, the dielectric constant of the organic solvent can be measured with a liquid dielectric constant meter Model 871 manufactured by Nihon Rufuto Co., Ltd. at 25° C.

The amount of the organic solvent used in the finely pulverizing treatment may be of a level that can maintain a dispersion state of the hydrophobically modified cellulose fibers, and is not particularly limited. For example, the amount used in terms of a solid ingredient content in the subjects to be treated such as a suspension is an amount of preferably 0.01% by mass or more, and preferably an amount of 50% by mass or less.

Thus, fine hydrophobically modified cellulose fibers wherein hydrophobically modified cellulose fibers are bound to a modifying group can be obtained. The fine hydrophobically modified cellulose fibers can be used in the state of dispersion as described later, or alternatively they can be used in a dried powdery form by removing an organic solvent from a dispersion by means of a drying treatment or the like.

The fine hydrophobically modified cellulose fibers produced by the method for production of the present invention have excellent dispersibility. One of ordinary skill in the art would not conceive the present invention in which the further low costs of the method for production and the simplification of the steps can be accomplished by remarking on the average fiber length of the hydrophobically modified cellulose fibers bound to a modifying group and shortening the average fiber length within a specified range, from the conventionally known inventions.

[Dispersion of Fine Hydrophobically Modified Cellulose Fibers]

The dispersion of the fine hydrophobically modified cellulose fibers refers to a dispersion of fine hydrophobically modified cellulose fibers dispersed in a medium.

(Fine Hydrophobically Modified Cellulose Fibers)

The fine hydrophobically modified cellulose fibers include those explained in "Method for Producing Fine Hydrophobically Modified Cellulose Fibers" mentioned above.

The content of the fine hydrophobically modified cellulose fibers in the dispersion is preferably 0.01% by mass or more, more preferably 0.05% by mass or more, and even more preferably 0.1% by mass or more, from the viewpoint of improving the mechanical properties of the materials when the cellulose fibers are applied to the materials. On the other hand, the content is preferably 5% by mass or less, more preferably 3% by mass or less, and even more preferably 2% by mass or less, from the viewpoint of handling.

(Medium)

The medium is preferably an organic medium, and the medium is more preferably an organic solvent, from the viewpoint of the dispersibility. Further, it is even more preferable that the medium in the dispersion and the organic solvent used during the finely pulverizing treatment are identical.

The content of the medium in the dispersion is not particularly limited so long as the fine hydrophobically modified cellulose fibers can be dispersed in the medium, and the content is preferably 95% by mass or more, more preferably 97% by mass or more, and even more preferably 98% by mass or more. On the other hand, the content is preferably 99.99% by mass or less, more preferably 99.95% by mass or less, and even more preferably 99.92% by mass or less. When the media are two or more kinds, a content as referred to herein is a total content of each medium.

The dispersion may contain optional components that do not impair the effects of the present invention in the above dispersion. The content of these optional components in the dispersion, based on 100 parts by mass of the dispersion, is preferably 0.1 parts by mass or more, more preferably 0.2 parts by mass or more, and even more preferably 0.5 parts by mass or more, and preferably 20 parts by mass or less, more preferably 15 parts by mass or less, and even more preferably 10 parts by mass or less. When the optional components are two or more kinds, the amount of the optional components is a total amount of each of the optional components.

[Method for Producing Dispersion of Fine Hydrophobically Modified Cellulose Fibers]

The method for producing a dispersion of fine hydrophobically modified cellulose fibers of the present invention is a method for production wherein anionic group-containing anionically modified cellulose fibers are bound to a modifying group, including subjecting the hydrophobically modified cellulose fibers having an average fiber length of 1 μm or more and 1,000 μm or less to a finely pulverizing treatment in an organic solvent. The hydrophobically modified cellulose fibers, and an organic solvent, a medium, and the step of subjecting hydrophobically modified cellulose fibers to a finely pulverizing treatment in an organic solvent are as described above.

When the medium in the dispersion and the organic solvent used during the finely pulverizing treatment are identical, the dispersion after the finely pulverizing treatment would be a dispersion of fine hydrophobically modified cellulose fibers. Alternatively, if necessary, a medium of the dispersion after the finely pulverizing treatment may be changed.

<Resin Composition and Method for Production Thereof>

The resin composition of the present invention is obtained by mixing fine hydrophobically modified cellulose fibers produced by the above method for production with a resin, or mixing a dispersion of fine hydrophobically modified cellulose fibers produced by the above method for production with a resin, and the fine hydrophobically modified cellulose fibers are produced by the method for production of the present invention described above. By using the resin composition, a molded article can be produced in accordance with a known molding method.

(Resin)

The resin which can be used is not particularly limited, and, for example, a thermoplastic resin, a curable resin, a cellulosic resin, or an elastomeric resin can be used. The thermoplastic resin, the curable resin, the cellulosic resin, and the elastomeric resin may be used alone or in a combination of two or more kinds.

(Thermoplastic Resin)

The thermoplastic resin includes saturated polyester resins such as polylactic acid resins; olefinic resins such as polyethylene resins and polypropylene resins; vinyl resins such as vinyl chloride resins, vinylidene chloride resins, styrene resins, vinyl ether resins, polyvinyl alcohol resins, polyvinyl acetal resins, and polyvinyl acetate resins; (meth) acrylic resins; vinyl ether resins; polyvinyl alcohol resins; polyvinyl acetal resins; polyvinyl acetate resins; polyamide resins; polycarbonate resins; polysulfonate resins; polyurethane resins; and the like. These thermoplastic resins may be used alone or may be used as mixed resins of two or more kinds. Among them, the olefinic resins, the polycarbonate resins, the (meth)acrylic resins, the vinyl chloride resins, and the polyurethane resins are preferred, because the resin composition having excellent dispersibility is obtained. Here, the term (meth)acrylic resin as used herein means the concepts embracing methacrylic resins and acrylic resins.

As the (meth)acrylic resin, those containing 50% by mass or more of methyl (meth)acrylate as a monomer unit, on the basis of a total of the monomer units of the entire polymer constituting the resin are preferred, and a methacrylic resin is more preferred.

The methacrylic resin can be produced by copolymerizing methyl methacrylate and other monomer copolymerizable therewith. The polymerization method is not particularly limited, and includes, for example, a bulk polymerization method, a solution polymerization method, a suspension polymerization method, a casting polymerization method, e.g. a cell casting polymerization method, and the like.

(Curable Resin)

The curable resin is preferably a photo-curable resin and/or a thermosetting resin.

The photo-curable resin allows to progress the polymerization reaction by irradiation of active energy rays such as ultraviolet rays or electron beams, using a photopolymerization initiator that generates a radical or a cation.

The above photopolymerization initiator includes, for example, acetophenones, benzophenones, ketals, anthraquinones, thioxanthones, azo compounds, peroxides, 2,3-dialkyldione compounds, disulfide compounds, thiuram compounds, fluoroamine compounds, and the like. More specifically, the photopolymerization initiator includes compounds listed in paragraph 0113 of Japanese Patent Laid-Open No. 2018-024967.

With the photopolymerization initiator, for example, a monomer (monofunctional monomer, polyfunctional monomer), or an oligomer or resin or the like, having a reactive unsaturated group can be polymerized.

The monofunctional monomer includes, for example, (meth)acrylic monomers such as (meth)acrylic acid esters; vinyl-based monomers such as vinyl pyrrolidone; (meth) acrylates having a bridged cyclohydrocarbon group such as isobornyl (meth)acrylate and adamantyl (meth)acrylate; and the like. The polyfunctional monomer contains a polyfunctional monomer having 2 to 8 or so polymerizable groups, and the bifunctional monomer includes, for example, di(meth)acrylates having a bridged cyclohydrocarbon group such as ethylene glycol di(meth)acrylate and propylene glycol di(meth)acrylate, and the like. The tri- to octo-functional monomer includes, for example, glycerol tri(meth)acrylate, and the like.

Examples of the oligomer or resin having a reactive unsaturated group include (meth)acrylates of alkylene oxide adducts of bisphenol A, epoxy (meth)acrylates (bisphenol A type epoxy (meth)acrylate, novolak type epoxy (meth)acrylate, etc.), polyester (meth)acrylates (e.g., aliphatic polyester-type (meth)acrylates, aromatic polyester-type (meth) acrylates, etc.), urethane (meth)acrylates (polyester-type urethane (meth)acrylates, polyether-type urethane (meth) acrylates, etc.), silicone (meth)acrylates, and the like. The above oligomer or resin may be used together with the above monomer.

The photo-curable resin is preferred, from the viewpoint of providing a resin composition or a molded article having a smaller amount of aggregates, and having excellent transparency.

The thermosetting resin includes, for example, epoxy resins, phenoxy resins, phenolic resins, urea resins, melamine resins, unsaturated polyester resins, diallyl phthalate resins, polyurethane resins, silicone resins, polyimide resins, and the like. The thermosetting resin can be used alone or in a combination of two or more kinds. Among them, the epoxy resins, the phenoxy resins, the phenolic resins, the urea resins, the melamine resins, the unsaturated polyester resins, and the polyurethane resins are preferred, and the epoxy resins, the phenolic resins, the phenoxy resins, and the polyurethane resins are more preferred, from the viewpoint of obtaining a dispersion having excellent dispersibility.

When the above resin components are used, it is preferable to use a curing agent. By blending a curing agent, molded articles obtained from the resin composition can be firmly molded, whereby the mechanical strength can be improved. Here, the blending amount of the curing agent may be appropriately set depending upon the kinds of the resins and/or the kinds of the curing agents used.

(Cellulosic Resin)

The cellulosic resin includes organic acid esters of cellulose mixed acylates such as cellulose acetate and cellulose acetate propionate; inorganic acid esters such as nitrate cellulose and phosphate cellulose; mixed acid esters of organic acid-inorganic acid such as acetate nitrate cellulose; cellulose ether esters such as acetylated hydroxypropyl cellulose; and the like. The above cellulose acetate includes cellulose triacetate (degree of acetyl substitution: 2.6 to 3), cellulose diacetate (degree of acetyl substitution: 2 or more and less than 2.6), and cellulose monoacetate. The cellulosic resins may be used alone or in a combination of two or more kinds.

(Elastomeric Resin)

In addition, in the present invention, an elastomeric resin can be used as a resin. In the elastomeric resin, a blended product of an inorganic filler such as carbon black or silica is widely used as a reinforcing material in order to increase the strength, but the reinforcing effects are considered to have some limitations. However, it is considered that since a resin composition obtained by blending the dispersion with an elastomeric resin has excellent dispersibility, it is made possible to provide a dispersion or a molded article (a rubber) having excellent mechanical strength and heat resistance.

As the elastomeric resin, a diene-based rubber or a non-diene-based rubber is preferred.

The diene-based rubber includes natural rubbers, polyisoprene rubbers, polybutadiene rubbers, styrene-butadiene copolymer rubbers, butyl rubbers, butadiene-acrylonitrile copolymer rubbers, chloroprene rubbers, modified natural rubbers, and the like. The modified natural rubber includes epoxidized natural rubbers, hydrogenated natural rubbers, and the like. The non-diene-based rubber includes butyl rubbers, ethylene-propylene rubbers, ethylene-propylene-diene rubbers, urethane rubbers, silicone rubbers, fluorine-containing rubbers, acrylic rubbers, vulcanized rubbers, epichlorohydrin rubbers, and the like. These can be used alone or in a combination of two or more kinds.

Comprehensively, the resin to be contained in the resin composition is preferably one or more members selected from the group consisting of the olefinic resins, the polyurethane resins, the polycarbonate resins, the (meth)acrylic resins, the epoxy resins, the phenolic resins, the phenoxy resins, the vinyl resins, and the elastomeric resins.

The amount of the resin in the resin composition of the present invention is not unconditionally determined because the amount depends upon the desired physical properties or the molding methods of the molded article, and the amount, calculated in terms of the blending amount, is preferably 10% by mass or more, more preferably 20% by mass or more, more preferably 30% by mass or more, and even more preferably 40% by mass or more, from the viewpoint of exhibiting the performance inherently owned by the resin, and on the other hand, the amount is preferably 99.9% by mass or less, more preferably 99% by mass or less, more preferably 90% by mass or less, and even more preferably 80% by mass or less, from the viewpoint of exhibiting the additive effects of the fine hydrophobically modified cellulose fibers.

The amount of the fine hydrophobically modified cellulose fibers in the resin composition of the present invention is not unconditionally determined because the amount depends upon the desired physical properties or the molding methods of the molded article, and the amount, calculated in terms of the blending amount based on 100 parts by mass of the resin, is preferably 0.1 parts by mass or more, more preferably 0.3 parts by mass or more, even more preferably 0.5 parts by mass or more, and even more preferably 1 part by mass or more, from the viewpoint of exhibiting the additive effects of the fine hydrophobically modified cellulose fibers, and on the other hand, the amount is preferably 100 parts by mass or less, more preferably 50 parts by mass or less, even more preferably 30 parts by mass or less, and even more preferably 10 parts by mass or less.

(Other Components)

The resin composition of the present invention can contain, besides the components mentioned above, a plasticizer, a crystal nucleating agent, a filler including an inorganic filler and an organic filler, a hydrolysis inhibitor, a flame retardant, an antioxidant, a lubricant such as a hydrocarbon wax or an anionic surfactant, an ultraviolet absorbent, an antistatic agent, an anti-clouding agent, a photostabilizer, a pigment, a mildewproof agent, a bactericidal agent, a blowing agent, or a surfactant; a polysaccharide such as starch or alginic acid; a natural protein such as gelatin, glue, or casein; an inorganic compound such as tannin, zeolite, ceramics, or a metal powder; a perfume; a fluidity modulator; a leveling agent; an electroconductive agent; an ultraviolet dispersant; a deodorant; or the like, within the range that would not impair the effects of the present invention. In addition, similarly, other polymeric materials and other resin compositions can be properly added within the range that would not impair the effects of the present invention.

The plasticizer is not particularly limited, and includes polycarboxylate esters such as phthalate esters, succinate esters, and adipate esters; fatty acid esters of an aliphatic polyol such as glycerol; and the like, which are conventional plasticizers. Specific examples include plasticizers listed in Japanese Patent Laid-Open Nos. 2008-174718 and 2008-115372.

In addition, when the resin composition of the present invention contains an elastomeric resin, the resin composition can be optionally blended with various additives generally blended in tires and other rubbers as other components besides those mentioned above that are ordinarily used in the rubber industries, including fillers for reinforcements such as carbon black or silica, various chemicals including, for example, a vulcanizing agent, a vulcanization accelerator, an aging inhibitor, a scorching inhibitor, zinc oxide, stearic acid, a process oil, a vegetable fat or oil, a plasticizer or the like in a conventional general amount within the range that would not impair the object of the present invention.

(Method for Producing Resin Composition)

The Resin Composition of the Present Invention can be Produced by mixing a dispersion and a resin mentioned above with a high-pressure homogenizer, or mixing each of the components, i.e., fine hydrophobically modified cellulose fibers, a medium, and a resin with a high-pressure homogenizer. Alternatively, the resin composition can be prepared by agitating each of these components with a Henschel mixer or a co-rotating agitator, or melt-kneading each of these components with a known kneader such as a tightly closed kneader, a single-screw or twin-screw extruder, or an open roller-type kneader.

<Molded Article>

The molded article can be produced by appropriately applying a known molding method such as extrusion-molding, injection-molding, press molding, casting molding, or solvent casting to a resin composition. Since the resin composition of the present invention has excellent dispersibility of the fine hydrophobically modified cellulose fibers, the mechanical strength of the various resin manufactured articles which are molded articles is improved as compared to that of the conventional products. For this reason, the molded article can be suitably used in various applications.

The applications for which the resin composition and the molded article can be used are not particularly limited, and the resin composition and the molded article can be used in, for example, transparent resin materials, three-dimensional modeling materials, cushioning materials, repairing materials, bonding agents, adhesives, sealing materials, heat insulators, acoustic materials, artificial leather materials, paints, electronic materials, wrapping materials, tires, automobile parts, and fiber composite materials. Among them, the applications for transparent resin materials, bonding agents, adhesives, artificial leather materials, paints, electronic materials, and fiber composite materials are particularly preferred, from the viewpoint of obtaining a molded article having excellent transparency, and the applications for three-dimensional modeling materials, cushioning materials, repairing materials, sealing materials, heat insulators, acoustic materials, tires, and automobile parts are preferred, from the viewpoint of exhibiting the strength.

With respect to the above-mentioned embodiments, the present invention further discloses the following methods for producing fine hydrophobically modified cellulose fibers, dispersions of fine hydrophobically modified cellulose fibers, resin compositions, or resin molded articles, the use of hydrophobically modified cellulose fibers having an average fiber length of 1 μm or more and 1,000 μm or less, the resin compositions, and the resin molded article.

<1> A method for producing fine hydrophobically modified cellulose fibers wherein anionic group-containing anionically modified cellulose fibers are bound to a modifying group, the method including subjecting hydrophobically modified cellulose fibers having an average fiber length of 1 μm or more and 1,000 μm or less to a finely pulverizing treatment in an organic solvent.

<2> The method for production according to the above <1>, wherein the hydrophobically modified cellulose fibers are produced by, irrespective of the orders, preferably introducing the cellulose fibers with an anionic group, introducing the cellulose fibers with a modifying group, and subjecting the cellulose fibers to a fiber shortening treatment, and more preferably by any one the following processes of:
(1) introducing the raw material cellulose fibers with an anionic group to provide anionic group-containing aninically modified cellulose fibers, subjecting the anionic group-containing anionically modified cellulose fibers to a fiber shortening treatment, and subsequently introducing the cellulose fibers with a modifying group;
(2) introducing the raw material cellulose fibers with an anionic group to provide anionic group-containing anionically modified cellulose fibers, introducing the anionically modified cellulose fibers with a modifying group, and subsequently subjecting the anionic group-containing anionically modified cellulose fibers to a fiber shortening treatment;
(3) subjecting the raw material cellulose fibers to a fiber shortening treatment, introducing the fiber-shortened cellulose fibers with an anionic group to provide anionic group-containing anionically modified cellulose fibers, and subsequently introducing the cellulose fibers with a modifying group;
(4) introducing the raw material cellulose fibers with a modifying group at a hydroxyl group, introducing the modified cellulose fibers with an anionic group, and subsequently subjecting the modified cellulose fibers to a fiber shortening treatment;
(5) introducing the raw material cellulose fibers with a modifying group at a hydroxyl group, subjecting the modified cellulose fibers to a fiber shortening treatment, and subsequently introducing the fiber-shortened cellulose fibers with an anionic group; and
(6) subjecting the raw material cellulose fibers to a fiber shortening treatment, introducing the fiber-shortened cellulose fibers with a modifying group at a hydroxyl group, and subsequently introducing the cellulose fibers with an anionic group, and more preferably produced through the process (1).

<3> The method for production according to the above <1> or <2>, wherein the content of the anionic group in the anionically modified cellulose fibers is preferably 0.1 mmol/g or more, more preferably 0.5 mmol/g or more, and even more preferably 0.8 mmol/g or more, and preferably 3 mmol/g or less, more preferably 2 mmol/g or less, and even more preferably 1.8 mmol/g or less.

<4> The method for production according to any one of the above <1> to <3>, wherein the content of the anionic group in the anionically modified cellulose fibers is 0.1 mmol/g or more.

<5> The method for production according to any one of the above <1> to <4>, wherein the content of the anionic group in the anionically modified cellulose fibers is 0.5 mmol/g or more.

<6> The method for production according to any one of the above <1> to <5>, wherein the content of the anionic group in the anionically modified cellulose fibers is 0.8 mmol/g or more.

<7> The method for production according to any one of the above <1> to <6>, wherein the content of the anionic group in the anionically modified cellulose fibers is 3 mmol/g or less.

<8> The method for production according to any one of the above <1> to <7>, wherein the content of the anionic group in the anionically modified cellulose fibers is 2 mmol/g or less.

<9> The method for production according to any one of the above <1> to <8>, wherein the content of the anionic group in the anionically modified cellulose fibers is 1.8 mmol/g or less.

<10> The method for production according to any one of the above <1> to <9>, wherein the content of the hydroxyl group in the anionically modified cellulose fibers is preferably 0.5 mmol/g or more, more preferably 1.0 mmol/g or more, and even more preferably 2.0 mmol/g or more, and preferably 20 mmol/g or less, more preferably 19 mmol/g or less, and even more preferably 18 mmol/g or less.

<11> The method for production according to any one of the above <1> to <10>, wherein the anionic group preferably contains one or more members selected from the group consisting of a carboxy group, a sulfonate group, and a phosphate group, and the anionic group is more preferably a carboxy group.

<12> The method for production according to any one of the above <1> to <11>, wherein the anionic group is a carboxy group.

<13> The method for production according to any one of the above <1> to <12>, wherein the method of introducing cellulose fibers with a carboxy group as an anionic group is preferably a method of subjecting to an oxidization treatment including treating with an oxidizing agent such as sodium hypochlorite and a bromide such as sodium bromide using 2,2,6,6-tetramethyl-1-piperidine-N-oxyl as a catalyst.

<14> The method for production according to any one of the above <1> to <13>, wherein the average fiber length of the hydrophobically modified cellulose fibers is preferably 5 μm or more, more preferably 10 μm or more, and even more preferably 25 μm or more, and preferably 800 μm or less, more preferably 500 μm or less, and even more preferably 400 μm or less.

<15> The method for production according to any one of the above <1> to <14>, wherein the average fiber length of the hydrophobically modified cellulose fibers is 1 μm or more and 500 μm or less.

<16> The method for production according to any one of the above <1> to <15>, wherein the average fiber length of the hydrophobically modified cellulose fibers is 5 μm or more.

<17> The method for production according to any one of the above <1> to <16>, wherein the average fiber length of the hydrophobically modified cellulose fibers is 10 μm or more.

<18> The method for production according to any one of the above <1> to <17>, wherein the average fiber length of the hydrophobically modified cellulose fibers is 25 μm or more.

<19> The method for production according to any one of the above <1> to <18>, wherein the average fiber length of the hydrophobically modified cellulose fibers is 800 μm or less.

<20> The method for production according to any one of the above <1> to <19>, wherein the average fiber length of the hydrophobically modified cellulose fibers is 500 μm or less.

<21> The method for production according to any one of the above <1> to <20>, wherein the average fiber length of the hydrophobically modified cellulose fibers is 400 μm or less.

<22> The method for production according to any one of the above <1> to <21>, wherein the cellulose fibers to be treated to a fiber shortening treatment are preferably (1) anionically modified cellulose fibers obtained through the step of introducing the raw material cellulose fibers with an anionic group;
(2) anionically modified cellulose fibers obtained through the steps of introducing the raw material cellulose fibers with an anionic group, and subsequently introducing the cellulose fibers with a modifying group; and
(3) the raw material cellulose fibers, and more preferably the anionically modified cellulose fibers of (1).

<23> The method for production according to any one of the above <1> to <22>, wherein the fiber shortening treatment is accomplished by subjecting cellulose fibers to be treated to one or more treatment methods selected from the group consisting of alkali hydrolysis treatment, acid hydrolysis treatment, ultraviolet treatment, electronic beam treatment, hydrothermal decomposition treatment, mechanical treatment, and enzyme treatment.

<24> The method for production according to any one of the above <1> to <23>, wherein the hydrophobically modified cellulose fibers are preferably a compound having a modifying group bound with an anionic group via an ionic bonding and/or a covalent bonding.

<25> The method for production according to any one of the above <1> to <24>, wherein the cellulose fibers to be introduced with a modifying group are preferably
(1) anionically modified cellulose fibers obtained through the steps of introducing the raw material cellulose fibers with an anionic group, and subsequently subjecting the cellulose fibers to a fiber shortening treatment;
(2) anionically modified cellulose fibers obtained through the steps of introducing the raw material cellulose fibers with an anionic group; and
(3) anionically modified cellulose fibers obtained through the steps of subjecting the raw material cellulose fibers to a fiber shortening treatment, and subsequently introducing the fiber-shortened cellulose fibers with an anionic group, and more preferably the anionically modified cellulose fibers of (1).

<26> The method for production according to any one of the above <1> to <25>, wherein the binding form is preferably an ionic bonding, and wherein the modifying group species is preferably one or more members selected from the group consisting of primary amines, secondary amines, tertiary amines, phosphonium compounds, and EOPO amines.

<27> The method for production according to any one of the above <1> to <26>, wherein the number of carbon atoms of the primary amine, the secondary amine, and the tertiary amine is preferably 2 or more, and more preferably 6 or more, and the number of carbon atoms is preferably 30 or less, more preferably 24 or less, and even more preferably 18 or less.

<28> The method for production according to any one of the above <1> to <27>, wherein the primary amines, the secondary amines, and the tertiary amines are preferably propylamine, dipropylamine, butylamine, dibutylamine, hexylamine, 2-ethylhexylamine, dihexylamine, trihexylamine, octylamine, dioctylamine, trioctylamine, dodecylamine, didodecylamine, distearylamine, oleylamine, aniline, octadecylamine, and dimethylbehenylamine.

<29> The method for production according to any one of the above <1> to <28>, wherein the EOPO amine is preferably a compound represented by the above formula (i), and wherein the molecular weight of the EO/PO copolymer moiety in the EOPO amine is preferably 500 or more, more preferably 1,000 or more, and even more preferably 1,500 or more, and preferably 10,000 or less, more preferably 7,000 or less, even more preferably 5,000 or less, even more preferably 4,000 or less, even more preferably 3,500 or less, and even more preferably 2,500 or less.

<30> The method for production according to any one of the above <1> to <29>, wherein the average fiber diameter of the fine hydrophobically modified cellulose fibers is preferably 0.1 nm or more, more preferably 0.5 nm or more, even more preferably 1 nm or more, and even more preferably 2 nm or more, and preferably 200 nm or less, more preferably 100 nm or less, even more preferably 50 nm or less, and even more preferably 20 nm or less.

<31> The method for production according to any one of the above <1> to <30>, wherein the average fiber length of the fine hydrophobically modified cellulose fibers is preferably 50 nm or more, more preferably 80 nm or more, and even more preferably 100 nm or more, and preferably 1,000 nm or less, more preferably 500 nm or less, and even more preferably 300 nm or less.

<32> The method for production according to any one of the above <1> to <31>, wherein the step of preparing fine hydrophobically modified cellulose fibers is a step of subjecting hydrophobically modified cellulose fibers having a given average fiber length to a finely pulverizing treatment in an organic solvent with preferably a dispersing machine.

<33> The method for production according to any one of the above <1> to <32>, wherein the preferred dispersing machines are a disintegrator, a beating machine, a low-pressure homogenizer, a high-pressure homogenizer, a grinder, a cutter mill, a ball-mill, a jet mill, a short shaft extruder, a twin-screw extruder, an ultrasonic agitator, and a juice mixer for households.

<34> The method for production according to any one of the above <1> to <33>, wherein the organic solvent preferably contains one or more organic solvents selected from the group consisting of methanol, ethanol, benzyl alcohol, N,N-dimethylformamide, dimethyl sulfoxide, N,N-dimethylacetamide, N-methylpyrrolidone, n-propanol, and ethylene glycol.

<35> A method for producing a dispersion of fine hydrophobically modified cellulose fibers wherein anionic group-containing anionically modified cellulose fibers are bound to a modifying group, the method including subjecting hydrophobically modified cellulose fibers having an average fiber length of 1 μm or more and 1,000 μm or less to a finely pulverizing treatment in an organic solvent.

<36> Use of hydrophobically modified cellulose fibers wherein anionic group-containing anionically modified cellulose fibers are bound to a modifying group, having an average fiber length of 1 μm or more and 1,000 μm or less, in a method for producing fine hydrophobically modified cellulose fibers.

<37> The method for production according to the above <35> or the use according to the above <36>, wherein the average fiber length of the hydrophobically modified cellulose fibers is preferably 5 μm or more, more preferably 10 μm or more, and even more preferably 25 μm or more, and preferably 800 μm or less, more preferably 500 μm or less, and even more preferably 400 μm or less.

<38> The method for production according to the above <35> or the use according to the above <36>, wherein the average fiber diameter of the hydrophobically modified cellulose fibers is preferably 5 μm or more, and more preferably 7 μm or more, and preferably 500 μm or less, and more preferably 300 μm or less.

<39> The method for production according to any one of the above <1> to <34>, wherein the compound having a modifying group is one or more amines selected from the group consisting of the amines represented by the following general formulas (1) to (3):

 (1)

 (2)

 (3)

wherein $R^1$ in the general formula (1) is a linear or branched, saturated or unsaturated hydrocarbon group having 6 or more carbon atoms and 30 or less carbon atoms; each of $R^2$ and $R^{2'}$ in the general formula (2), which may be identical or different, is a linear or branched, saturated or unsaturated hydrocarbon group in which a total number of carbon atoms of $R^2$ and $R^{2'}$ is 8 or more and 40 or less; and each of $R^3$, $R^{3'}$ and $R^{3''}$ in the general formula (3), which may be identical or different, is a linear or branched, saturated or unsaturated hydrocarbon group in which a total number of carbon atoms of $R^3$, $R^{3'}$ and $R^{3''}$ is 9 or more and 50 or less.

<40> The method for production according to any one of the above <1> to <34> and <39>, wherein the compound having a modifying group is one or more amines selected from the group consisting of primary amines, secondary amines, and tertiary amines.

<41> The method for production according to any one of the above <1> to <34>, <39> and <40>, wherein a total mass of the modifying group in the hydrophobically modified cellulose fibers, based on 100 parts by mass of the amount of the cellulose fibers, is 1 part by mass or more and 200 parts by mass or less.

<42> The method for production according to any one of the above <1> to <34>, and <39> to <41>, wherein the organic solvent contains one or more organic solvents selected from the group consisting of N,N-dimethylformamide, dimethyl sulfoxide, N,N-dimethylacetamide, N-methylpyrrolidone, tetrahydrofuran (THF), a diester obtained from succinic acid and triethylene glycol monomethyl ether, dichloromethane, chloroform, toluene, acetic acid, methanol, ethanol, benzyl alcohol, n-propanol, 2-propanol, ethylene glycol, propylene glycol, t-butyl alcohol, cyclohexanone, acetonitrile, silicone oil, 1,3-dioxolane, methyl acetate, ethyl acetate, butyl acetate, acetone, and methyl ethyl ketone.

<43> The method for production according to any one of the above <1> to <34>, and <39> to <42>, wherein the organic solvent contains one or more organic solvents selected from the group consisting of acrylates such as methyl acrylate, methyl methacrylate, ethyl acrylate, ethyl methacrylate, butyl acrylate, butyl methacrylate, n-hexyl acrylate, n-hexyl methacrylate, 2-ethylhexyl acrylate, 2-ethylhexyl methacrylate, and phenyl glycidyl ether acrylate; urethane prepolymers such as hexamethylene diisocyanate urethane prepolymers and phenyl glycidyl ether acrylate toluene diisocyanate urethane prepolymers; glycidyl ethers such as n-butyl glycidyl ether, 2-ethylhexyl glycidyl ether, stearyl glycidyl ether, styrene oxide, phenyl glycidyl ether, nonylphenyl glycidyl ether, butylphenyl glycidyl ether, 1,6-hexanediol diglycidyl ether, ethylene glycol diglycidyl ether, and diethylene glycol diglycidyl ether; chlorostyrene, methoxystyrene, butoxystyrene, and vinylbenzoic acid.

<44> The method for production according to any one of the above <1> to <34>, and <39> to <43>, wherein the dielectric constant at 25° C. of the organic solvent is preferably 75 or less, more preferably 55 or less, and even more preferably 45 or less, and on the other hand, the dielectric constant is preferably 1 or more, more preferably 2 or more, and even more preferably 3 or more.

<45> A method for producing a resin composition including mixing fine hydrophobically modified cellulose fibers produced by a method for production as defined in any one of the above <1> to <34>, and <39> to <43>, or a dispersion of fine hydrophobically modified cellulose fibers produced by a method for production as defined in the above <35> with a resin.

<46> The method for producing a resin composition according to the above <45>, wherein the resin is one or more members selected from the group consisting of olefinic resins, polyurethane resins, polycarbonate resins, (meth)acrylic resins, epoxy resins, phenolic resins, phenoxy resins, vinyl resins, and elastomeric resins.

<47> A method for producing a resin molded article including molding a resin composition produced by a method for producing a resin composition as defined in the above <45> or <46>.

<48> A resin composition obtained by mixing fine hydrophobically modified cellulose fibers produced by a method for production as defined in any one of the above <1> to <34> and <39> to <44>, or a dispersion of fine hydrophobically modified cellulose fibers produced by a method for production as defined in the above <35> with a resin.

<49> The resin composition according to the above <48>, wherein the resin is one or more members selected from the group consisting of olefinic resins, polyurethane resins, polycarbonate resins, (meth)acrylic resins, epoxy resins, phenolic resins, phenoxy resins, vinyl resins, and elastomeric resins.

<50> A resin molded article containing a resin composition as defined in the above <48> or <49> molded therewith.

<51> The resin composition according to the above <48> or <49>, wherein the amount of the resin in the resin composition, calculated in terms of the blending amount, is preferably 10% by mass or more, more preferably 20% by mass or more, more preferably 30% by mass or more, and even more preferably 40% by mass or more, and on the other hand, the amount is preferably 99.9% by mass or less, more preferably 99% by mass or less, more preferably 90% by mass or less, and even more preferably 80% by mass or less.

<52> The resin composition according to any one of the above <48>, <49> and <51>, wherein the amount of the fine hydrophobically modified cellulose fibers in the resin composition, calculated in terms of the blending amount, based on 100 parts by mass of the resin, is preferably 0.1 parts by mass or more, more preferably 0.3 parts by mass or more, even more preferably 0.5 parts by mass or more, and even more preferably 1 part by mass or more, and on the other hand, the amount is preferably 100 parts by mass or less, more preferably 50 parts by mass or less, even more preferably 30 parts by mass or less, and even more preferably 10 parts by mass or less.

EXAMPLES

The present invention will be described more specifically by means of the following Examples. Here, the Examples are mere exemplifications of the present invention, without intending to limit the present invention thereto. Parts in Examples are parts by mass unless specified otherwise. Here, "ambient pressure" means 101.3 kPa, and "room temperature" means 25° C.

[Average Fiber Diameter and Average Fiber Length of Cellulose Fibers, Anionic Group-Containing Cellulose

[Fibers, Fiber-Shortened Cellulose Fibers, and Hydrophobically Modified Cellulose Fibers]

Ion-exchanged water is added to cellulose fibers to be measured, to provide a dispersion, a content of which is 0.01% by mass. The dispersion is measured with a wet-dispersion type image analysis particle counter manufactured by JASCO International Co., Ltd. under the trade name of IF-3200, under the conditions of a front lens: 2 folds, telecentric zoom lens: 1 fold, image resolution: 0.835 µm/pixel, syringe inner diameter: 6,515 µm, spacer thickness: 500 µm, image recognition mode: ghost, threshold value: 8, amount of analytical sample: 1 mL, and sampling: 15%. One hundred or more cellulose fibers are measured, an average ISO fiber diameter thereof is calculated as an average fiber diameter, and an average ISO fiber length is calculated as an average fiber length.

[Average Fiber Diameter and Average Fiber Length of Fine Hydrophobically Modified Cellulose Fibers]

Ion-exchanged water or a mixed solvent of methanol/water=2/1 is added to fine hydrophobically modified cellulose fibers to provide a dispersion of which content is 0.0001% by mass. The dispersion is added dropwise to mica (mica), and dried to provide an observation sample. A fiber height of the cellulose fibers in the observation sample is measured with an atomic force microscope (AFM), Nanoscope III Tapping mode AFM, manufactured by Digital Instrument, a probe used being Point Probe (NCH) manufactured by NANOSENSORS. During that measurement, 100 or more sets of cellulose fibers are extracted from a microscopic image in which the cellulose fibers can be confirmed, and an average fiber diameter is calculated from the fiber heights of the fibers. An average fiber length is calculated from a distance in the direction of fibers.

[Content of Anionic Group of Anionic Group-Containing Cellulose Fibers, Fiber-Shortened Cellulose Fibers, and Hydrophobically Modified Cellulose Fibers]

Cellulose fibers to be measured with the mass of 0.5 g on a dry basis are placed in a 100 mL beaker, ion-exchanged water or a mixed solvent of methanol/water=2/1 is added thereto to make up a total volume of 55 mL. Five milliliters of a 0.01 M aqueous sodium chloride solution is added thereto to provide a dispersion. The dispersion is stirred until the cellulose fibers are sufficiently dispersed. A 0.1 M hydrochloric acid is added to this dispersion to adjust its pH to 2.5 to 3, and a 0.05 M aqueous sodium hydroxide solution is added dropwise to the dispersion with an automated titration instrument manufactured by DKK-TOA CORPORATION under the trade name of "AUT-710," under the conditions of a waiting time of 60 seconds. The values of electroconductivity and a pH are measured every minute. The measurements are continued up to a pH of 11 or so to obtain an electroconductivity curve. A titrated amount of sodium hydroxide is obtained from this electroconductivity curve, and the content of the anionic group of the cellulose fibers to be measured is calculated in accordance with the following formula:

Content of Anionic Group,mmol/g=Titrated Amount of Sodium Hydroxide×Aqueous Sodium Hydroxide Solution Concentration(0.05 M)/Mass of Cellulose Fibers to Be Measured (0.5 g)

[Content of Hydroxyl Groups of Anionic Group-Containing Cellulose Fibers]

The content of hydroxyl group of the anionic group-containing cellulose fibers is measured in accordance with the following method. Specifically, the cellulose fibers before the anionically modifying treatment are dried under a reduced pressure at 100° C. for one hour, and the mass thereof is measured (non-treated mass W0). Next, the cellulose fibers subjected to an anionically modifying treatment are dried under a reduced pressure at 100° C. for one hour, and the mass thereof is measured (treated mass W1). The amount of hydroxyl groups of the anionic group-containing cellulose fibers is calculated by the following formula from a non-treated mass W0 and a treated mass W1 obtained.

Hydroxyl Groups of Anionic Group-Containing Cellulose Fibers (mmol/g)=1000×((W1−W0)/(Molecular Weight of Anionic Group to Be Introduced−1.008))/W0

[Solid Ingredient Content in Dispersion or Dispersed Solution]

Using a halogen moisture balance manufactured by Shimadzu Corporation under the trade name of MOC-120H, measurements with a one-gram sample are taken in a thermostat held at 150° C. every 30 seconds, and a value at which a weight loss is 0.1% or less is defined as a solid ingredient content.

[Average Binding Amount and Introduction Ratio (Ionic Bonding) of Modifying Groups of Hydrophobically Modified Cellulose Fibers]

The binding amount of the modifying group is obtained in accordance with the following IR determination method, and an average binding amount and an introduction ratio are calculated in accordance with the following formulas. The IR determination method is specifically taken by subjecting dried hydrophobically modified cellulose fibers to a measurement according to ATR method with an infrared absorption spectrophotometer (IR) manufactured by Thermo Fisher Scientific K.K. under the trade name of Nicolet 6700, and a binding amount and an introduction ratio of the modifying group are calculated in accordance with the following formulas. The following is a case where the anionic group is a carboxy group. "Peak Intensity at 1720 $cm^{-1}$" mentioned below refers to a peak intensity ascribed to a carbonyl group. Here, in a case where an anionic group is other than the carboxy group, the average binding amount and the introduction ratio of the modifying group may be calculated by appropriately changing the value for a peak intensity.

Average Binding Amount of Modifying Group, mmol/g=[Carboxy Group Content of Cellulose Fibers Before Introduction of Modifying Group, mmol/g]×[(Peak Intensity at 1720 $cm^{-1}$ of Cellulose Fibers Before Introduction of Modifying Group÷Peak Intensity at 1720 $cm^{-1}$ of Hydrophobically Modified Cellulose Fibers)÷Peak Intensity at 1720 $cm^{-1}$ of Cellulose Fibers Before Introduction of Modifying Group]

Peak Intensity at 1720 $cm^{-1}$: Peak intensity ascribed to a carbonyl group of the carboxylic acid Introduction Ratio of Modifying Group, %={Average Binding Amount of Modifying Group, mmol/g/Content of Carboxy Group in Cellulose Fibers Before Introduction of Modifying Group, mmol/g}×100

[Average Binding Amount and Introduction Ratio (Amide Bonding) of Modifying Group of Hydrophobically Modified Cellulose Fibers]

The average binding amount of the modifying group is calculated by the following formula. The following is a case where the anionic group is a carboxy group. Here, in a case where an anionic group is other than the carboxy group, the average binding amount and the introduction ratio of the modifying group may be calculated by replacing the carboxy group with the anionic group.

Average Binding Amount of Modifying Group, mmol/g=Content of Carboxy Group in the Cellulose Fibers Before Introduction of Modifying Group,mmol/g−Content of Carboxy Group in Cellulose Fibers After Introduction of Modifying Group,mmol/g Introduction Ratio of Modifying Group, %={Average Binding Amount of Modifying Group, mmol/g/Content of Carboxy Group in Cellulose Fibers Before Introduction of Modifying Group, mmol/g}×100

[Total Parts by Mass of Modifying Group Based on 100 Parts by Mass of Cellulose Raw Materials in Hydrophobically Modified Cellulose Fibers]

The mass of a modifying group is calculated from "the average binding amount of the modifying group of the hydrophobically modified cellulose fibers" mentioned above and the molecular weight of a compound having a modifying group, and the mass of the cellulose raw materials is calculated as follows in terms of "cellulose fibers (conversion amount)" given below.

[Cellulose Fibers (Conversion Amount) in Hydrophobically Modified Cellulose Fibers]

The cellulose fibers (conversion amount) in the hydrophobically modified cellulose fibers are measured in accordance with the following methods:

(1) In a Case where a Compound Having a Modifying Group to be Added is One Kind

The amount of the cellulose fibers (conversion amount) is calculated by the following formula A:

Amount of Cellulose Fibers(Conversion Amount), g=Mass of Hydrophobically Modified Cellulose Fibers,g/[1+Molecular Weight of Compound Having Modifying Group,g/mol×Binding Amount of Modifying Group,mmol/g×0.001]  <Formula A>

(2) In a Case where Compounds Having a Modifying Group to be Added are Two or More Kinds The amount of the cellulose fibers (conversion amount) is calculated, taking a molar proportion of each of the compounds having a modifying group (i.e., a molar ratio when a total molar amount of each of the compounds having a modifying group to be added is defined as 1) into consideration.

Here, in a case where the binding form of the cellulose fibers and a compound having a modifying group is an ionic bonding, in the formula A mentioned above, the phrase "Molecular Weight of Compound Having Modifying Group" in a case where the compound having a modifying group is a primary amine, a secondary amine, or a tertiary amine refers to "a molecular weight of an entirety of compounds having modifying groups including a copolymer moiety."

On the other hand, in a case where the binding form of the cellulose fibers and the compound having a modifying group is an amide bonding, in the formula A mentioned above, the phrase "Molecular Weight of Compound Having Modifying Group" in a case where the compound having a modifying group is a primary amine or a secondary amine refers to "a molecular weight of an entirety of compounds having modifying groups including a copolymer moiety minus 18 (−18)."

[Preparation of Anionic Group-Containing Cellulose Fibers]

Preparation Example 1—Needle-Leaf Oxidized Pulp

Needle-leaf bleached kraft pulp manufactured by Fletcher Challenge Canada Ltd., under the trade name of "Machenzie," CSF 650 ml, was used as natural cellulose fibers. As TEMPO, a commercially available product manufactured by ALDRICH, Free radical, 98% by mass, was used. As sodium hypochlorite, a commercially available product manufactured by Wako Pure Chemical Industries, Ltd. was used. As sodium bromide, a commercially available product manufactured by Wako Pure Chemical Industries, Ltd. was used.

First, 100 g of the needle-leaf bleached kraft pulp fibers were sufficiently stirred in 9,900 g of ion-exchanged water, and 1.6 g of TEMPO, 10 g of sodium bromide, and 28.4 g of sodium hypochlorite were added in that order to 100 g of the mass of the pulp. Using a pH stud titration with an automated titration instrument "AUT-701" manufactured by DKK-TOA CORPORATION, a 0.5 M sodium hydroxide was added dropwise under sufficient stirring to keep a pH at 10.5. After the reaction was carried out at 20° C. for 120 minutes, the dropwise addition of sodium hydroxide was stopped, to provide oxidized cellulose fibers. The oxidized cellulose fibers obtained were sufficiently washed with ion-exchanged water until the filtrate showed a value of 200 μs/cm or less in the electroconductivity measurement with a compact electric conductivity meter manufactured by Horiba, LTD. (LAQUAtwin EC-33B), and subsequently subjected to a dehydration treatment, to provide oxidized cellulose fibers having a solid ingredient of 34.6%. The resulting oxidized cellulose fibers had an average fiber diameter of 40 μm, an average fiber length of 2022 μm, and a carboxy group content of 1.56 mmol/g.

Preparation Example 2—Broad-Leaf Oxidized Pulp

The same procedures as in Preparation Example 1 were carried out except for changing to broad-leaf bleached kraft pulp derived from eucalyptus manufactured by CENIBRA, to provide oxidized cellulose fibers. The resulting oxidized cellulose fibers had a solid ingredient of 25.7%, an average fiber diameter of 39 μm, an average fiber length of 1285 μm, and a content of carboxy group of 1.00 mmol/g.

[Preparation of Fiber-Shortened Cellulose Fibers]

Preparation Example 3—Fiber Shortening Treatment by Alkali Hydrolysis

The amount 144.5 g of the oxidized cellulose fibers after the dehydration treatment obtained in Preparation Example 1 was diluted with 1,000 g of ion-exchanged water, and 1.4 g of a 35% aqueous hydrogen peroxide (1 part by mass of hydrogen peroxide based on 100 parts by mass of the absolutely dried mass of the raw material cellulose fibers) was added thereto, and its pH was adjusted to 12 with 1 M sodium hydroxide. Subsequently, an alkali hydrolysis treatment was carried out at 80° C. for 2 hours, a solid ingredient content of the oxidized cellulose fibers being 4.3% by mass. The oxidized cellulose fibers obtained were sufficiently washed, to provide fiber-shortened cellulose fibers having a solid ingredient of 28.6%. The resulting fiber-shortened cellulose fibers had an average fiber diameter of 39 μm, an average fiber length of 387 μm, and a content of carboxy group of 1.29 mmol/g.

Preparation Example 4—Fiber Shortening Treatment by Acid Hydrolysis

The amount 92.54 g of the oxidized cellulose fibers after the dehydration treatment obtained in Preparation Example 1 was diluted with 1,000 g of ion-exchanged water, and 346 g of concentrated hydrochloric acid (389 parts by mass based on 100 parts by mass of the absolutely dried mass of the raw material cellulose fibers) was added thereto, to provide a dispersion of oxidized cellulose fibers, a solid ingredient content of which was 2.34% by mass, and a hydrochloric acid concentration of 2.5 M, pH being 1 or less. The dispersion was refluxed at 105° C. for 10 minutes to carry out an acid hydrolysis treatment. The resulting oxidized cellulose fibers were sufficiently washed, to provide fiber-shortened cellulose fibers having a solid ingredient of 47.9%. The resulting fiber-shortened cellulose fibers had an average fiber diameter of 24 μm, an average fiber length of 53 μm, and a content of carboxy group of 1.00 mmol/g.

[Modifying Group Species]

Hexylamine, 2-Ethylhexylamine, Dodecylamine, Oleylamine, Dihexylamine, and Trihexylamine: All are commercially available reagents EOPO amine: Amine obtained by Production Example 1 shown below.

Production Example 1—Production of EOPO Amine

A 1-L autoclave was charged with 132 g (1 mol) of propylene glycol tertiary butyl ether, the content was heated to 75° C., 1.2 g of a flake-like potassium hydroxide was added thereto, and the mixture was stirred to dissolve. Next, 1,541 g of ethylene oxide (EO) and 35 g of propylene oxide (PO) were reacted at 110° C. and 0.34 MPa, and 7.14 g of magnesium silicate, manufactured by The Dallas Group of America under the trade name of MAGNESOL 30/40, was then supplied thereto and neutralized at 95° C. To the formed product obtained was added 0.16 g of di-tert-butyl-p-cresol, and mixed, and the mixture obtained was then filtered, to provide an EO/PO copolymer a polyether.

On the other hand, the polyether obtained above (8.4 mL/min), ammonia (12.6 mL/min), and hydrogen (0.8 mL/min) were each supplied to a 1.250 mL tubular reaction vessel packed with a catalyst of nickel oxide/copper oxide/chromium oxide in a molar ratio of 75/23/2, manufactured by Wako Pure Chemical Industries, Ltd. The temperature of the vessel was maintained at 190° C., and the pressure was maintained at 14 MPa. Subsequently, a crude discharged liquid mixture from the vessel was distilled off at 70° C. and 3.5 mmHg for 30 minutes. A flask was charged with 200 g of an amino-containing polyether obtained and 93.6 g of a 15% aqueous hydrochloric acid solution, the reaction mixture was heated at 100° C. for 3.75 hours, to open tertiary butyl ether with the acid. Moreover, the formed product was neutralized with 144 g of a 15% aqueous potassium hydroxide solution. Next, a neutralized formed product was distilled off under a reduced pressure at 112° C. for one hour, and a residue was filtered, to provide a monoamine having an EO/PO copolymer moiety represented by the formula (i). Here, in the monoamine obtained, the EO/PO copolymer moiety was directly bound to the amine, and $R_1$ in the formula (i) was a hydrogen atom.

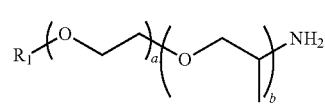

Here, the molecular weight of the amine copolymer moiety was calculated as 2,000 by rounding off the value obtained by:

1541[Molecular Weight of $EO$(44)×Number of Moles of $EO$ Added(35)]+464[Molecular Weight of $PO$(58)×Number of Moles of $PO$ Added(8.0)]+58[Partial Molecular Weight of $PO$ of Starting Raw Materials(Propylene Glycol)]=2063.

Example 1

[Preparation of Hydrophobically Modified Cellulose Fibers]

A beaker equipped with a magnetic stirrer and a stirring bar was charged with 0.15 g of fiber-shortened cellulose fibers obtained in Preparation Example 3, in terms of the absolutely dried mass. Subsequently, the beaker was charged with an EOPO amine prepared in Production Example 1 in an amount corresponding to 0.3 mol of amino groups based on one mol of the carboxy groups of the fiber-shortened cellulose fibers, and the components were dissolved in 30 g of methyl ethyl ketone (MEK). The liquid reaction mixture was allowed to react at room temperature, 25° C., for 1 hour, to provide an MEK suspension of hydrophobically modified cellulose fibers in which fiber-shortened cellulose fibers were bound to amino groups, a solid ingredient content of which was 0.5% by mass. The resulting hydrophobically modified cellulose fibers had an average fiber diameter of 39 μm and an average fiber length of 387 μm.

[Finely Pulverizing Treatment]

Next, a suspension obtained was subjected to a finely pulverizing treatment. Specifically, a suspension obtained was stirred with a homogenizer T.K. ROBOMICS manufactured by PRIMIX Corporation at 5,000 rpm for 5 minutes, and thereafter subjected to a 10-pass treatment with a high-pressure homogenizer manufactured by YOSHIDA KIKAI CO., LTD. under the trade name of "NanoVater L-ES" at 100 MPa. By the treatment, a dispersion in which fine hydrophobically modified cellulose fibers were dispersed in MEK, a solid ingredient content of which was 0.5% by mass, was provided.

Example 2

The same procedures as in Example 1 were carried out except that fiber-shortened cellulose fibers obtained in Preparation Example 4 were used, to provide a suspension of hydrophobically modified cellulose fibers and a dispersion in which the fine hydrophobically modified cellulose fibers were dispersed in MEK, a solid ingredient content of which was 0.5% by mass.

Examples 3 and 4

The same procedures as in Example 1 were carried out except that N,N-dimethylformamide (DMF) or isopropanol (IPA) was used in place of MEK, to provide a suspension of hydrophobically modified cellulose fibers and a dispersion in which the fine hydrophobically modified cellulose fibers were dispersed in DMF (Example 3), and a suspension of hydrophobically modified cellulose fibers and a dispersion in which the fine hydrophobically modified cellulose fibers were dispersed in IPA (Example 4), a solid ingredient content of each dispersion being 0.5% by mass.

Examples 5 and 6

The same procedures as in Example 1 were carried out except that the amount of MEK used in dissolving was changed to 150 g or 15 g, to provide a suspension of hydrophobically modified cellulose fibers and a dispersion in which the fine hydrophobically modified cellulose fibers were dispersed in MEK (Example 5), a solid ingredient content of which was 0.1% by mass, and a dispersion in which the fine hydrophobically modified cellulose fibers were dispersed in MEK (Example 6), a solid ingredient content of which was 1.0% by mass.

Examples 7 to 12

The same procedures as in Example 1 were carried out except that each compound listed in Table 1 or 2 was used in place of the EOPO amine as a modifying group species, to provide a suspension of hydrophobically modified cellulose fibers and a dispersion in which the fine hydrophobically modified cellulose fibers were dispersed in MEK, a solid ingredient content of which was 0.5% by mass. Here, the amount of the modifying group species charged was an amount corresponding to one mol of amino groups based on one mol of carboxy groups of the fiber-shortened cellulose fibers.

Example 13

The same procedures as in Example 12 were carried out except that DMF was used in place of MEK, to provide a suspension of hydrophobically modified cellulose fibers and a dispersion in which the fine hydrophobically modified cellulose fibers were dispersed in DMF, a solid ingredient content of the dispersion being 0.5% by mass. The resulting fine hydrophobically modified cellulose fibers had an average fiber diameter of 2.7 nm and an average fiber length of 231 nm.

Example 14

The same procedures as in Example 2 were carried out except that ethyl acetate was used in place of MEK, to provide a suspension of hydrophobically modified cellulose fibers and a dispersion in which the fine hydrophobically modified cellulose fibers were dispersed in ethyl acetate, a solid ingredient content of the dispersion being 0.5% by mass.

Comparative Examples 1 and 2

The same procedures as in Example 1 were carried out except that oxidized cellulose fibers obtained in Preparation Example 1 or 2 were used in place of the fiber-shortened cellulose fibers obtained in Preparation Example 3, to provide a MEK suspension of hydrophobically modified cellulose fibers, a solid ingredient content of which was 0.5% by mass.

The properties of the fine hydrophobically modified cellulose fibers obtained or the hydrophobically modified cellulose fibers of Comparative Examples were evaluated in accordance with the methods of the following Test Examples 1 and 2. The results are shown in Tables 1 and 2.

Test Example 1—Dispersion Stability Test

A dispersion of cellulose fibers obtained was allowed to stand at room temperature for a period of one day, and the transparency and the presence or absence of the precipitates were confirmed visually, and evaluated on the basis of the following evaluation criteria.
Evaluation S: High transparency without forming precipitates;
Evaluation A: Slightly turbid but without forming precipitates;
Evaluation B: Precipitates being partly confirmed; and
Evaluation C: Completely separated, and an entire amount being precipitated.

The evaluation for the dispersion stability was ranked in the order of S> A>B>C, in which the dispersion stability S shows a particularly excellent nano-dispersibility, the dispersion stability A shows an excellent dispersion stability, and the dispersion stability B shows a dispersion stability of a level without any troubles in practical use.

Test Example 2—Nano-Dispersibility Evaluation Test

A dispersion of cellulose fibers obtained was transferred to a glass container, and the presence or absence of the birefringence distinctively owned by the nano-dispersion in the observation via a polarization plate was confirmed, and evaluated on the basis of the following evaluation criteria.
Presence: Birefringence could be confirmed; and
Absence: Birefringence could not be confirmed.

The matter that the birefringence could be confirmed means that the cellulose fibers held a nano-order size, thereby forming a self-organization structure without being aggregated.

TABLE 1

| | | Examples | | | | | | |
|---|---|---|---|---|---|---|---|---|
| | | 1 | 2 | 3 | 4 | 5 | 6 | 7 |
| Anionically Modified Cellulose Fibers | | | | | | | | |
| Prep. Ex. | | 3 | 4 | 3 | 3 | 3 | 3 | 3 |
| Anionic Group | | Carboxy group | Carboxy group | Carboxy group | Carboxy group | Carboxy group | Carboxy group | Carboxy group |
| Content of Anionic Group, mmol/g | | 1.29 | 1.00 | 1.29 | 1.29 | 1.29 | 1.29 | 1.29 |

TABLE 1-continued

| | Examples | | | | | | |
|---|---|---|---|---|---|---|---|
| | 1 | 2 | 3 | 4 | 5 | 6 | 7 |
| Means of Fiber Shortening Hydrophobically Modified Cellulose Fibers | Alkali hydrolysis | Acid hydrolysis | Alkali hydrolysis | Alkali hydrolysis | Alkali hydrolysis | Alkali hydrolysis | Alkali hydrolysis |
| Solvent | MEK | MEK | DMF | IPA | MEK | MEK | MEK |
| Modifying group species | EOPO amine | EOPO amine | EOPO amine | EOPO amine | EOPO amine | EOPO amine | Hexylamine |
| Binding form | Ionic bonding | Ionic bonding | Ionic bonding | Ionic bonding | Ionic bonding | Ionic bonding | Ionic bonding |
| Average fiber diameter, μm | 39 | 24 | 39 | 39 | 39 | 39 | 39 |
| Average fiber length, μm | 387 | 53 | 387 | 387 | 387 | 387 | 387 |
| Dispersion of Fine Hydrophobically Modified Cellulose | | | | | | | |
| Solid ingredient concentration, % by mass | 0.5 | 0.5 | 0.5 | 0.5 | 0.1 | 1.0 | 0.5 |
| Dispersion stability | A | A | A | A | A | A | B |
| Birefringence | Presence | Presence | Presence | Presence | Presence | Presence | Presence |

TABLE 2

| | Examples | | | | | | | Comparative Examples | |
|---|---|---|---|---|---|---|---|---|---|
| | 8 | 9 | 10 | 11 | 12 | 13 | 14 | 1 | 2 |
| Anionically Modified Cellulose Fibers | | | | | | | | | |
| Prep. Ex. | 3 | 3 | 3 | 3 | 3 | 3 | 4 | 1 | 2 |
| Anionic Group | Carboxy group | Carboxy group | Carboxy group | Carboxy group | Carboxy group | Carboxy group | Carboxy group | Carboxy group | Carboxy group |
| Content of Anionic Group, mmol/g | 1.29 | 1.29 | 1.29 | 1.29 | 1.29 | 1.29 | 1.00 | 1.56 | 1.00 |
| Means of Fiber Shortening Hydrophobically Modified Cellulose Fibers | Alkali hydrolysis | Alkali hydrolysis | Alkali hydrolysis | Alkali hydrolysis | Alkali hydrolysis | Alkali hydrolysis | Acid hydrolysis | — | — |
| Solvent | MEK | MEK | MEK | MEK | MEK | DMF | Ethyl acetate | MEK | MEK |
| Modifying group species | 2-Ethyl-hexylamine | Dodecyl-amine | Oleyl-amine | Dihexyl-amine | Trihexyl-amine | Trihexyl-amine | EOPO amine | EOPO amine | EOPO amine |
| Binding form | Ionic bonding | Ionic bonding | Ionic bonding | Ionic bonding | Ionic bonding | Ionic bonding | Ionic bonding | Ionic bonding | Ionic bonding |
| Average fiber diameter, μm | 39 | 39 | 39 | 39 | 39 | 39 | 24 | 40 | 39 |
| Average fiber length, μm | 387 | 387 | 387 | 387 | 387 | 387 | 53 | 2022 | 1285 |
| Dispersion of (Fine) Hydrophobically Modified Cellulose | | | | | | | | | |
| Solid ingredient concentration, % by mass | 0.5 | 0.5 | 0.5 | 0.5 | 0.5 | 0.5 | 0.5 | 0.5 | 0.5 |
| Dispersion stability | B | A | A | A | A | S | A | C | C |
| Birefringence | Presence | Presence | Presence | Presence | Presence | Presence | Presence | Absence | Absence |

It could be seen from Tables 1 and 2 that according to the present invention, by selecting those having an average fiber length of 1000 μm or less as the cellulose fibers to be subjected to a finely pulverizing treatment, fine hydrophobically modified cellulose fibers having excellent dispersibility can be produced, irrespective of the kinds of the modifying group species and the solvents.

On the other hand, it could be seen that as shown in Comparative Examples 1 and 2, by selecting those having an average fiber length exceeding 1000 μm as the cellulose fibers to be subjected to a finely pulverizing treatment, the dispersion stability and the nano-dispersibility of the hydrophobically modified cellulose fibers prepared are low.

INDUSTRIAL APPLICABILITY

Since the fine hydrophobically modified cellulose fibers obtained by the method for production of the present invention have a high dispersibility in an organic solvent, a dispersion containing the fine hydrophobically modified cellulose fibers can be suitably used in various resin manufactured articles for daily sundries, household electric appliance parts, wrapping materials for household electric appliance parts, and various industrial applications such as automobile parts, more specifically, various resin manufactured articles for transparent resin materials, three-dimensional modeling materials, cushioning materials, repairing materials, bonding agents, sealing materials, heat insulators, acoustic materials, artificial leather materials, paints, electronic materials, wrapping materials, tires, automobile parts, and fiber composite materials.

The invention claimed is:

1. A method for producing fine hydrophobically modified cellulose fibers having an average fiber length of 1 μm or more and 1,000 μm or less comprising anionic group-containing anionically modified cellulose fibers bound to a modifying group, the method comprising:
subjecting anionically modified cellulose fibers to a fiber shortening treatment, subsequently introducing the anionically modified cellulose fibers to a modifying group to produce hydrophobically modified cellulose fibers comprising anionic group-containing anionically modified cellulose fibers, and thereafter subjecting the hydrophobically modified cellulose fibers to a finely pulverizing treatment in an organic solvent to produce the fine hydrophobically modified cellulose fibers;
wherein the fiber shortening treatment is a hydrothermal decomposition treatment.

2. The method for production according to claim 1, wherein the average fiber length of the hydrophobically modified cellulose fibers is 5 μm or more and 500 μm or less.

3. The method for production according to claim 1, wherein the average fiber diameter of the hydrophobically modified cellulose fibers is 1 μm or more and 300 μm or less.

4. The method for production according to claim 1, wherein the anionic group comprises one or more groups selected from the group consisting of a carboxy group, a sulfonate group, and a phosphate group.

5. The method for production according to claim 1, wherein the anionic group is a carboxy group.

6. The method for production according to claim 1, wherein the step of introducing the anioninically modified cellulose fibers to the modifying group includes bonding the anionic group-containing anionically modified cellulose fibers to a compound having the modifying group at the anionic group via ionic bonding and/or a covalent bonding.

7. The method for production according to claim 6, wherein the compound having a modifying group is one or more amines selected from the group consisting of the amines represented by the following general formulas (1) to (3):

$$NH_2-R^1 \quad (1)$$

$$NH-R^2R^{2'} \quad (2)$$

$$N-R^3R^{3'}R^{3''} \quad (3)$$

wherein $R^1$ in the general formula (1) is a linear or branched, saturated or unsaturated hydrocarbon group having 6 or more carbon atoms and 30 or less carbon atoms; each of $R^2$ and $R^{2'}$ in the general formula (2), which may be identical or different, is a linear or branched, saturated or unsaturated hydrocarbon group in which a total number of carbon atoms of $R^2$ and $R^{2'}$ is 8 or more and 40 or less; and each of $R^3$, $R^{3'}$ and $R^{3''}$ in the general formula (3), which may be identical or different, is a linear or branched, saturated or unsaturated hydrocarbon group in which a total number of carbon atoms of $R^3$, $R^{3'}$ and $R^{3''}$ is 9 or more and 50 or less.

8. The method for production according to claim 6, wherein the compound having a modifying group is one or more amines selected from the group consisting of primary amines, secondary amines, and tertiary amines.

9. The method for production according to claim 1, wherein a total mass of the modifying group in the hydrophobically modified cellulose fibers, based on 100 parts by mass of the amount of the cellulose fibers, is 1 part by mass or more and 200 parts by mass or less.

10. The method for production according to claim 1, wherein the organic solvent comprises one or more organic solvents selected from the group consisting of N,N-dimethylformamide, dimethyl sulfoxide, N,N-dimethylacetamide, N-methylpyrrolidone, tetrahydrofuran (THF), a diester obtained from succinic acid and triethylene glycol monomethyl ether, dichloromethane, chloroform, toluene, acetic acid, methanol, ethanol, benzyl alcohol, n-propanol, 2-propanol, ethylene glycol, propylene glycol, t-butyl alcohol, cyclohexanone, acetonitrile, silicone oil, 1,3-dioxolane, methyl acetate, ethyl acetate, butyl acetate, acetone, and methyl ethyl ketone.

11. A method for producing a dispersion of fine hydrophobically modified cellulose fibers having an average fiber length of 1 μm or more and 1,000 μm or less comprising anionic group-containing anionically modified cellulose fibers bound to a modifying group, the method comprising:
subjecting anionically modified cellulose fibers to a fiber shortening treatment, subsequently introducing the anionically modified cellulose fibers to a modifying group to produce hydrophobically modified cellulose fibers comprising anionic group-containing anionically modified cellulose fibers, and thereafter subjecting the hydrophobically modified cellulose fibers to a finely pulverizing treatment in an organic solvent to produce the fine hydrophobically modified cellulose fibers;
wherein the fiber shortening treatment is a hydrothermal decomposition treatment.

12. A method for producing a resin composition comprising:
mixing fine hydrophobically modified cellulose fibers having an average fiber length of 1 μm or more and 1,000 μm or less produced by a method for production as defined in claim 1 with a resin.

13. A method for producing a resin molded article comprising molding a resin composition produced by a method for producing a resin composition as defined in claim 12.

14. A resin composition obtained by mixing: fine hydrophobically modified cellulose fibers produced by a method for production as defined in claim 1 with a resin.

15. A resin molded article comprising a resin composition as defined in claim 14 molded therewith.

16. A method for producing a resin composition comprising:
   mixing a dispersion of fine hydrophobically modified cellulose fibers wherein anionic group-containing anionically modified cellulose fibers are bound to a modifying group, with a resin; and
   wherein the dispersion of fine hydrophobically modified cellulose fibers are produced by a method as defined in claim 11.

* * * * *